US009178588B2

(12) United States Patent
Hwang et al.

(10) Patent No.: US 9,178,588 B2
(45) Date of Patent: Nov. 3, 2015

(54) METHOD FOR DETERMINING A TRANSMISSION DIRECTION FOR A COMMUNICATION, A METHOD FOR DETERMINING A PRECODING MATRIX FOR A COMMUNICATION, AND A DEVICE CONFIGURED TO DO THE SAME

(71) Applicant: Intel IP Corporation, Santa Clara, CA (US)

(72) Inventors: Yeong-Sun Hwang, Oberhaching (DE); Huaning Niu, Milpitas, CA (US); Holger Neuhaus, Munich (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/022,339

(22) Filed: Sep. 10, 2013

(65) Prior Publication Data

US 2015/0071367 A1     Mar. 12, 2015

(51) Int. Cl.
*H04B 7/04*     (2006.01)

(52) U.S. Cl.
CPC .................................. *H04B 7/0456* (2013.01)

(58) Field of Classification Search
CPC ... H04L 27/00; H04L 1/0003; H04L 27/0008; H04B 7/024; H04B 7/0456
USPC .................................................. 375/295, 296
See application file for complete search history.

(56) References Cited

U.S. PATENT DOCUMENTS

| 7,260,079 | B1 * | 8/2007 | Chapman et al. | ............. 370/338 |
| 2010/0322337 | A1 * | 12/2010 | Ylitalo et al. | ................. 375/267 |

OTHER PUBLICATIONS

3GPP LTE; Evolved Universal Terrestrial radio Access (E-UTRA); Physical channels and modulation (3GPP TS 36.211 v11.1.0), Dec. 2012, 109 pages.
3rd Generation Partnership Project; Technical Specification Group Radio Access Network; Evolved Universal Terrestrial Radio Access (E-UTRA); Physical layer procedures (Release 11), 3GPP TS 36.213 v11.1.0, Dec. 2012, 160 pages.
Choi et al., Interpolation based transmit beamforming for MIMO-OFDM with limited feedback, IEEE Transactions on Signal Processing, vol. 53, No. 11, Nov. 2005, pp. 4125-4135.
Khaled et al., Interpolation-Based Multi-Mode Precoding for MIMO-OFDM Systems with Limited Feedback, IEEE Transactions on Wireless Communications, vol. 6, No. 3, Mar. 2007., pp. 1003-1013.

(Continued)

*Primary Examiner* — Qutbuddin Ghulamali

(57) ABSTRACT

A method for determining a transmission direction for a communication of a network component of a radio communications network may include: determining a reference transmission direction based on a plurality of predetermined transmission directions that a network component of a radio communications network is configured to transmit at; selecting a plurality of candidate transmission directions in a spatial vicinity of the reference transmission direction, the plurality of candidate transmission directions being a subset of the plurality of predetermined transmission directions; and selecting a transmission direction for a communication of the network component from the reference transmission direction and the plurality of candidate transmission directions based on a selection criterion.

14 Claims, 15 Drawing Sheets

(56) References Cited

OTHER PUBLICATIONS

Benvenuto et al., Joint Low-Rate Feedback and Channel Quantization for the MIMO Broadcast Channel, IEEE Africon, Sep. 2007, 7 pages.

Wu et al., A Low-complexity Precoder Searching Algorithm for MIMO-OFDM Systems, IEEE 20th International Symposium on Personal, Indoor and Mobile Radio Communications, Sep. 2009, pp. 2021-2024.

* cited by examiner

METHOD FOR DETERMINING A TRANSMISSION DIRECTION FOR A COMMUNICATION, A METHOD FOR DETERMINING A PRECODING MATRIX FOR A COMMUNICATION, AND A DEVICE CONFIGURED TO DO THE SAME

TECHNICAL FIELD

Various aspects relate to a method for determining a transmission direction for a communication of a network component of a radio communications system, a method for determining a precoding matrix for a communication of a network component of a radio communications system, and a device configured to do the same.

BACKGROUND

Precoding is a technique by which each data stream at a network component (e.g. a base station) is weighted. Precoding may increase or maximize data throughput in a communications channel between the network component and a terminal (e.g. a UE). In multiple-input multiple-output (MIMO) systems, precoding may be a component of closed-loop link adaptation, whereby a transmit signal at the network component may be modified based on channel state information.

Precoding may be achieved by means of a matrix-multiplication of a given signal vector with a precoding matrix prior to transmission (e.g. by the network component). The precoding matrix may be determined based on a codebook of candidate precoding matrices. A size of the codebook (namely, the number of candidate precoding matrices) may be large, e.g. for communication systems or operation modes that may require accurate precoding. Determining the precoding matrix based on a large codebook of candidate precoding matrices may result in a significant computation load for a device configured to determine the precoding matrix, especially for such devices with tight limits on computational capacity and power consumption budget. Therefore, efficient ways of determining the precoding matrix are needed.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which:

FIG. 4 illustrates a plurality of predetermined transmission spatial directions that a network component may be configured to transmit at.

DESCRIPTION

Figure 1:
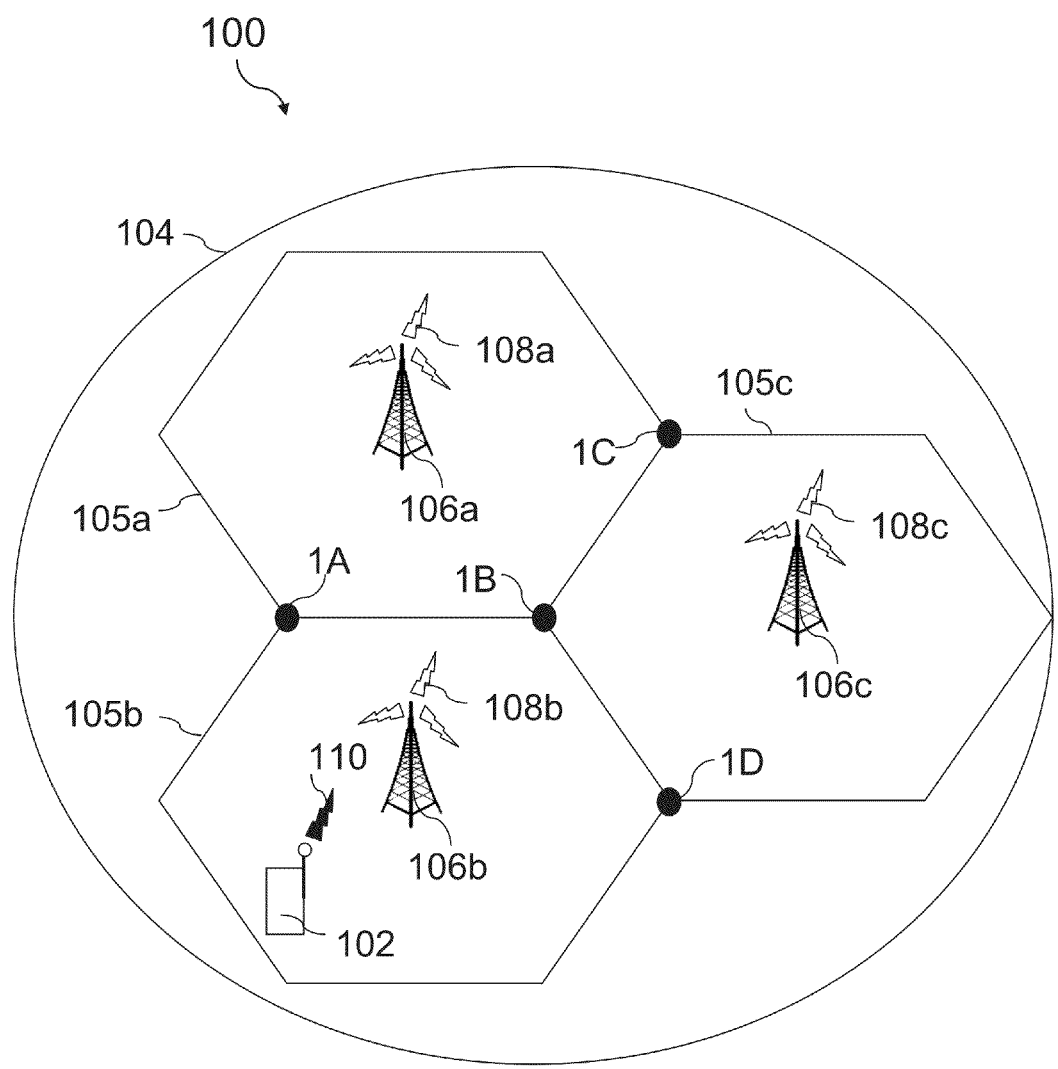
FIG. 1 shows a communications system.

The following detailed description refers to the accompanying drawings that show, by way of illustration, specific details and aspects in which the invention may be practised. These aspects are described in sufficient detail to enable those skilled in the art to practice the invention. Other aspects may be utilized and structural, logical, and electrical changes may be made without departing from the scope of the invention. The various aspects are not necessarily mutually exclusive, as some aspects can be combined with one or more other aspects to form new aspects. Various aspects are described for structures or devices, and various aspects are described for methods. It may be understood that one or more (e.g. all) aspects described in connection with structures or devices may be equally applicable to the methods, and vice versa.

The word "exemplary" is used herein to mean "serving as an example, instance, or illustration". Any aspect or design described herein as "exemplary" is not necessarily to be construed as preferred or advantageous over other aspects or designs.

The term "radio communications network" is used herein to refer to a radio communications system configured in accordance with the network architecture of any one of, or any combination of, LTE (Long Term Evolution) cellular communications technology, UMTS (Universal Mobile Telecommunications System) cellular communications technology which may include the system enhancement HSPA (High Speed Packet Access), GSM (Global System for Mobile Communications) cellular communications technology which may include system enhancements General Packet Radio System (GPRS) and Enhanced Data rates for GSM Evolution (EDGE) and CDMA2000 (Code Division Multiple Access) cellular communications technology, although other radio communications technology may be possible as well.

The terms "radio communications network", "network", "radio network", "cellular network", "radio network communications system", "cellular network communications system", "cellular radio communications technology", "cellular communications system" and "radio communications system" may refer to the same logical entity and may be used interchangeably throughout the entire description.

The word "circuit" is used herein to mean any kind of a logic implementing entity, which may be special purpose circuitry or processor executing software stored in a memory, firmware, or any combination thereof. Thus, in one or more examples, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Different circuits can thus also be implemented by the same component, e.g. by a processor executing two different programs.

FIG. 1 shows a communications system 100.

The communications system 100 may include a communications terminal 102 (which may also be referred to as a terminal 102), and at least one network component 106a, 106b, 106c, which may be part of a radio communications network 104. In other words, at least one of the network components 106a, 106b, 106c may be a component of the radio communications network 104.

Only one terminal 102 is shown as an example, however the number of terminals may be greater than one, and may, for example, be two, three, four, five, six, seven, eight, nine, or on the order of tens, hundreds of, or even more terminals. Likewise, only three network components 106a, 106b, 106c are shown as an example, however the number of network components may be one, two and may be more, for example, four, five, six, seven, eight, nine, or on the order of tens, hundreds of, or even more network components.

The communications system 100 and/or the radio communications network 104 may be configured in accordance with the network architecture of any one of, or any combination of, LTE (Long Term Evolution) cellular communications technology, UMTS (Universal Mobile Telecommunications System) cellular communications technology, GSM (Global System for Mobile Communications) cellular communications technology, and CDMA2000 (Code Division Multiple Access) cellular communications technology, although other cellular communications technology may be possible as well.

The terminal 102 may include, or may be, a UE (user equipment) equipped with a SIM (Subscriber Identity Module) running on a UICC (Universal Integrated Circuit Card), a computer (e.g. a laptop equipped with, for example, a wireless radio connection, such as, for example, a 3G ($3^{rd}$ generation) radio connection), or any other equipment that may be configured to connect to a radio communications network.

The terminal 102 (e.g. a UE) may be within the area of coverage of the radio communications network 104, such as, for example, a PLMN (Public Land Mobile Network). The area of coverage of the radio communications network 104 may be the aggregate result of the coverage of the at least one network component 106a, 106b, 106c of the radio communications network 104. In other words, each network component of the at least one network component 106a, 106b, 106c of the radio communications network 104 may have a respective area of coverage, and an aggregation of the respective areas of coverage may determine the area of coverage of the radio communications network 104. By way of an example, the area of coverage (which may also be referred to as "the region of coverage") of the radio communications network 104 shown in FIG. 1 may at least be the aggregate result of the coverage of the network components 106a, 106b, and 106c, and other network components belonging to the radio communications network 104 (other network components (e.g. base stations) are not shown in FIG. 1).

At least one of the network components 106a, 106b, 106c may include, or may be, a base station, a NB (Node B), an eNB (Evolved Node B), a Home NB, a traditional NB, and a wireless router, although other network components may be possible as well.

In FIG. 1, the terminal 102 may be configured to transmit an uplink (UL) signal 110 at a particular power. An uplink (UL) may refer to a connection (e.g. a communications connection) from the terminal 102 towards at least one network component (e.g. the network component 106b) of the radio communications network 104. Accordingly, the UL signal 110 may include, or may be, a signal transmitted from the terminal 102 (e.g. a UE) to at least one network component (e.g. the network component 106b, for example a base station) of the radio communications network 104.

In FIG. 1, the at least one network component 106a, 106b, and 106c (e.g. base station) may be configured to transmit a downlink (DL) signal at a particular power. A downlink (DL) may refer to a connection (e.g. a communications connection) from at least one of the network components 106a, 106b, 106c of the radio communications network 104 towards the terminal 102. Accordingly, a DL signal may include, or may be, a signal transmitted from the at least one network component 106a, 106b, 106c (e.g. base station) to the terminal 102 (e.g. a UE). By way of an example, the network component 106a may be configured to transmit a DL signal 108a; the network component 106b may be configured to transmit a DL signal 108b; and the network component 106c may be configured to transmit a DL signal 108c. The respective DL signals 108a, 108b, 108c transmitted by the at least one network component 106a, 106b, and 106c may, for example, cover a particular geographical area.

The geographical area covered by a network component (i.e. the region of coverage of a network component) of the at least one network component 106a, 106b, or 106c may be substantially (namely, approximately) represented by a cell (which may also be referred to as a "radio cell"). By way of an example, the region of coverage of the network component 106a may be substantially represented by a cell 105a; the region of coverage of the network component 106b may be substantially represented by a cell 105b; and the region of coverage of the network component 106c may be substantially represented by a cell 105c. Accordingly, the region of coverage of the radio communications network 104 may be represented by at least one cell, or by a tessellation of two or more cells, where each cell may be an approximation of the area of coverage of a network component (e.g. base station) of the radio communications network 104. By way of an example, area of coverage of the radio communications network 104 may represented by the tessellation of cells 105a, 105b, and 105c.

Whilst a respective cell 105a, 105b, 105c may be an approximation of the area of coverage of a respective network component 106a, 106b, 106c, there may be geographical regions that may be served by more than one network component. By way of an example, the geographical region on either side of a boundary formed by a line joining points 1A and 1B shown in FIG. 1 may be served by the network component 106a or the network component 106b, or both; the geographical region on either side of a boundary formed by a line joining points 1B and 1C may be served by the network component 106a or the network component 106c, or both; and the geographical region on either side of a boundary formed by a line joining points 1B and 1D may be served by the network component 106b or the network component 106c, or both.

A communications connection with the radio communications network 104 may be established by means of, for example, establishing at least one communications channel between the terminal 102 and at least one of the network components 106a, 106b, 106c. The at least one communications channel established between the terminal 102 and at least one of the network components 106a, 106b, 106c may include at least one UL channel (e.g. a channel from the terminal 102 to at least one of the network components 106a, 106b, 106c) and/or at least one DL channel (e.g. a channel from at least one of the network components 106a, 106b, 106c to the terminal 102).

A number of communications connections established between the terminal 102 and at least one of the network components 106a, 106b, 106c may depend, at least in part, on the number of antennas of the terminal 102 and the number of antennas of each of the network components 106a, 106b, 106c.

Figure 2:
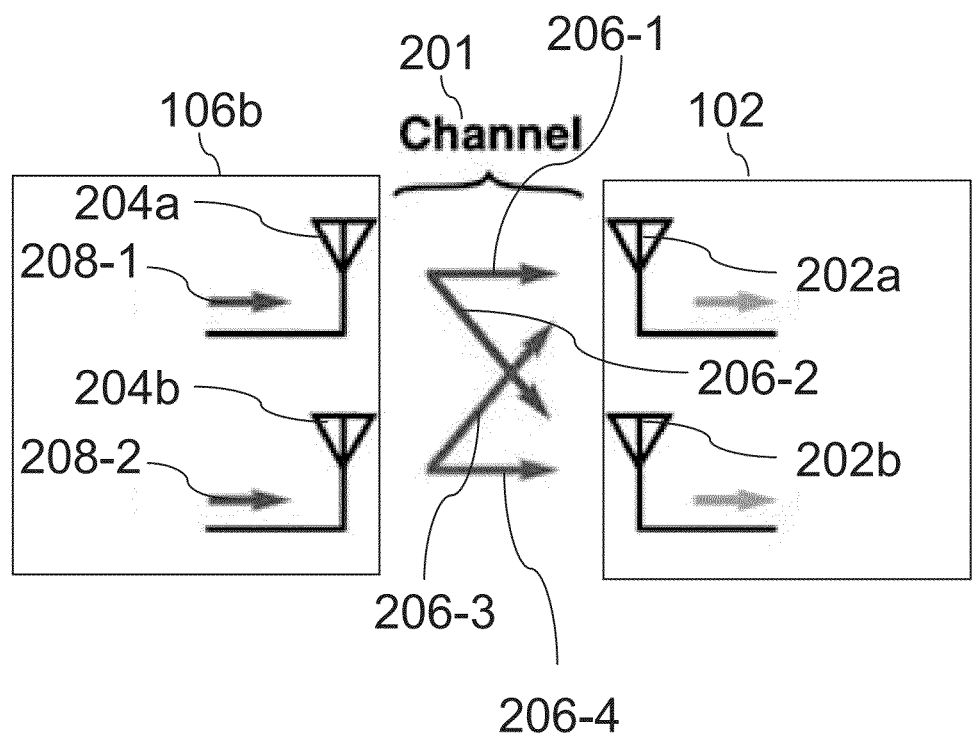
FIG. 2 shows a block diagram of a terminal and a network component.

FIG. 2 shows a block diagram 200 of the terminal 102 and the network component 106b.

The terminal 102 may include a plurality of antennas 202a, 202b. Only two antennas 202a, 202b are shown as an example, however the number of antennas may be greater than two, and may, for example, be three, four, five, six, seven, eight, nine, or on the order of tens, or even more antennas.

The network component 106b may include a plurality of antennas 204a, 204b. Only two antennas 204a, 204b are shown as an example, however the number of antennas may be greater than two, and may, for example, be three, four, five, six, seven, eight, nine, or on the order of tens, or even more antennas. The network component 106b is shown as an example in FIG. 2, and may be replaced by one or more of the network components 106a, 106b, 106c.

The example shown in FIG. 2 illustrates a communication of the network component 106b. For example, the communication of the network component 106b may include, or may be, a downlink communication of the network component 106b to a terminal of the radio communications system 104 (e.g. the terminal 102, as shown in FIG. 2). In other words, in the communication of the network component 106b, the network component 106b may be a transmitter (Tx) and a terminal of the radio communications system 104 (e.g. terminal 102) may be a receiver (Rx). In the example shown in FIG. 2, the DL signal 108b may be transmitted from the network component 106b (e.g. Tx) to the terminal 102 (e.g. Rx).

The radio communications network 104 in which the terminal 102 includes the plurality of antennas 202a, 202b, and in which the network component 106b includes the plurality of antennas 204a, 204b may be referred to as a multiple-input and multiple-output (MIMO) radio communications system.

A MIMO radio communications system may provide higher data rates and/or increased spectral efficiency due at least in part to the number of communications connections established and/or provided between the network component 106b and the terminal 102. For example, in a MIMO radio communications system, there may be a channel 201 between the network component 106b and the terminal 102. The channel 201 may include a plurality of communications connections 206-1, 206-2, 206-3, 206-4 between the plurality of antennas 202a, 202b of the terminal 102 and the plurality of antennas 204a, 204b of the network component 106b. For instance, in the example shown in FIG. 2, the communications connection 206-1 may represent the communications connection between antenna 202a of the terminal 102 and antenna 204a of the network component. In like manner, the communications connection 206-2 may represent the communications connection between antenna 202b of the terminal 102 and antenna 204a of the network component.

As described above, FIG. 2 may show a communication of the network component 106b (e.g. a downlink communication of the network component 106b). Accordingly, the channel 201 may include, or may be, a downlink channel. Consequently, the plurality of communications connections 206-1, 206-2, 206-3, 206-4 may represent DL communication connections between the network component 106b (the Tx) and the terminal 102 (the Rx).

Each connection of the plurality of communications connections 206-1, 206-2, 206-3, 206-4 may represent a combination (e.g. a unique combination) of transmission paths (e.g. all transmission paths) from the network component 106b (the Tx) and the terminal 102 (the Rx). The combination of transmission paths, also called multipath, may include zero or one direct line-of-sight (LOS) path and zero, one, or multiple non-line-of-sight (e.g. specular) path (which may result from reflection, scattering and/or diffraction from the surrounding environment).

As shown in FIG. 2, a plurality of data streams 208-1, 208-2 (which may also be referred to as a plurality of layers) may be transmitted by the network component 106b to the terminal 102. In the example shown in FIG. 2, only two data streams 208-1, 208-2 (equivalently two layers 208-1, 208-2) are shown as an example, however the number of data streams (i.e. number of layers) may be greater than two, and may, for example, be three, four, five, six, seven, eight, nine, or on the order of tens, or even more data streams or layers.

In the example shown in FIG. 2, the plurality of data streams 208-1, 208-2 may, for example, be transmitted as, or as part of, the DL signal 108b shown in FIG. 1. Depending on the quality of the plurality of communications connections 206-1, 206-2, 206-3, 206-4, the terminal 102 (the Rx) may or may not be able to properly recover the plurality of data streams 208-1, 208-2 transmitted by the network component 106b (the Tx). For example, the plurality of data streams 208-1, 208-2 may not be properly recovered at the terminal 102 (the Rx) if the signal-to-interference and noise ratio (SINR) at the plurality of antennas 202a, 202b of the terminal 102 (the Rx) is too low. This may, consequently, lead to a loss of data throughput (e.g. total data throughput, e.g. total received data throughput at the terminal 102).

Precoding may be used to increase or maximize data throughput (e.g. total data throughput, e.g. total received data throughput at the terminal 102).

Figure 3:
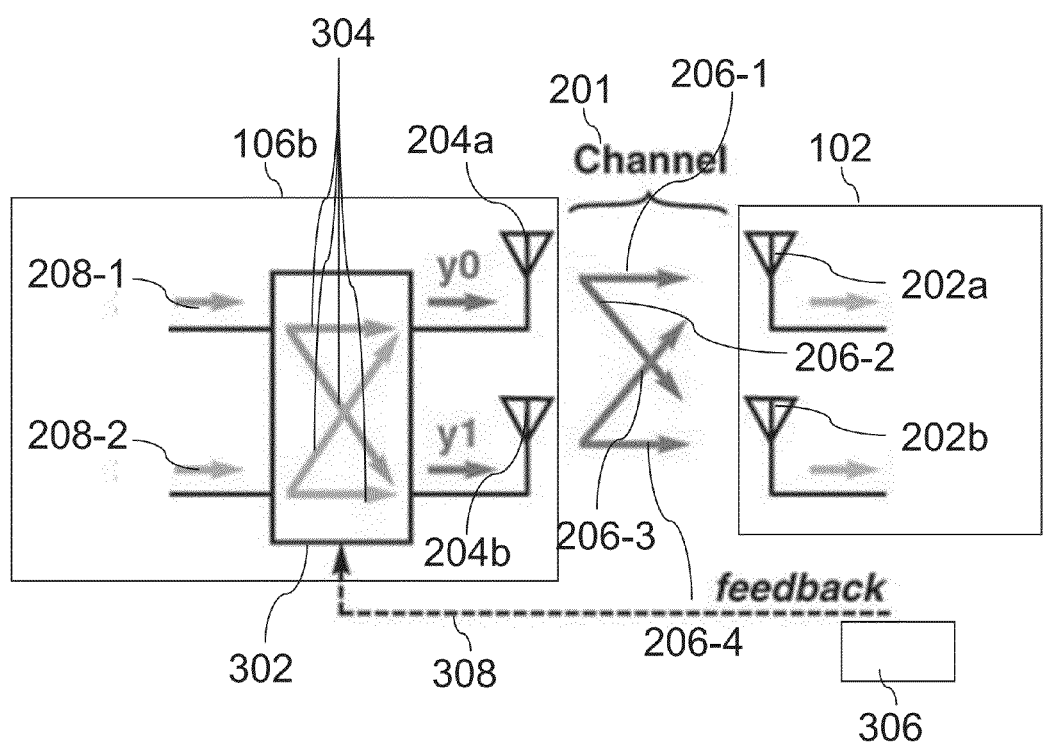
FIG. 3 shows a block diagram of a terminal and a network component including a precoder.

FIG. 3 shows a block diagram 300 of the terminal 102 and the network component 106b including a precoder 302.

Reference signs in FIG. 3 that are the same as in FIG. 2 denote the same or similar elements as in FIG. 2. Thus, those elements will not be described in detail again here; reference is made to the description above. Differences between FIG. 3 and FIG. 2 are described below.

The precoder 302 may weight each data stream of the plurality of data streams 208-1, 208-2 for the communication of the network component 106b (e.g. downlink communication of the network component 106b). This may, for example, be achieved by a matrix-multiplication of a transmission signal vector (whose components may include, or may be, the plurality of data streams 208-1, 208-2) with a precoding matrix. The matrix-multiplication may be performed prior to transmission by the network component 106b (the Tx). In other words, the precoding matrix may map the plurality of data streams 208-1, 208-2 (e.g. each data stream of the plurality of data streams 208-1, 208-2) to the plurality of antennas 204a, 204b (e.g. to each antenna of the plurality of antennas 204a, 204b). This mapping is shown as arrows 304 in FIG. 3. A result of the matrix-multiplication may include, or may be, the DL signal 108b, which may be transmitted from the network component 106b to the terminal 102 (e.g. by means of the plurality of antennas 204a, 204b via the channel 201 including plurality of communications connections 206-1, 206-2, 206-3, 206-4). In physical terms, effects of precoding on the channel 201 (e.g. DL channel) may be decoupled into beamforming and phase-rotation (or co-phasing), e.g. of a signal between the network component 106b and the terminal 102.

A choice of the precoding matrix may depend at least in part on the state (e.g. expected state) of the channel 201 (e.g. DL channel) at the time of the communication of the network component 106b (the Tx). In other words, the precoding matrix for mapping the plurality of data streams 208-1, 208-2 to the plurality of antennas 204a, 204b may depend at least in part on channel state information 306 of the channel 201 (e.g. DL channel). The precoding matrix for mapping the plurality of data streams 208-1, 208-2 to the plurality of antennas 204a, 204b may be adapted (e.g. changed) in case channel state information 306 of the channel 201 (e.g. downlink channel) changes. For example, initial channel state information 306 may result in a selection of an initial precoding matrix, and subsequent channel state information 306 (e.g. which may be different from the initial channel state information 306) may result in a selection of another precoding matrix which may be different from the initial precoding matrix.

In a MIMO radio communications system with a reciprocal channel, a quality of an UL channel between the terminal 102 (which may transmit a signal and/or data to the network component 106b) and the network component 106b (which may receive a signal and/or data from the terminal 102) (e.g. as measured by a criterion, e.g. achievable throughput, dropped call rate, ratio of number of data received indicators (ACKs) to number of data not received indicators (NACK)) may be at least substantially equal to a quality of a DL channel between the network component 106b (the Tx) and the terminal 102 (the Rx). In such an example, channel state information 306 of the DL channel may be inferred from channel state information of the UL channel which may be available to and/or determined at the network component 106b.

However, most MIMO radio communications systems may not include a reciprocal channel. Accordingly, in most MIMO radio communications systems, channel state information 306 of the channel 201 (e.g. DL channel) may be determined at the terminal 102 and subsequently fed back (indicated by arrow 308 in FIG. 3) to the network component 106b (e.g. by means of the uplink signal 110 shown in FIG. 1). Alternatively, or in addition, the terminal 102 may determine channel state information 306 of the channel 201 (e.g. DL channel) and may subsequently determine a precoder matrix for the communication of the network component 106b (e.g. downlink communication of the network component 106b). A parameter (e.g. an index) indicating which precoder matrix is determined may be subsequently fed back (indicated by arrow 308 in FIG. 3) to the network component 106b (e.g. by means of the uplink signal 110 shown in FIG. 1).

The precoder 302 may be a component (e.g. a key component) of closed-loop link adaptation. For example, the mapping of the plurality of data streams 208-1, 208-2 to the plurality of antennas 204a, 204b may be adapted (e.g. changed) based on the channel state information 306 that may be provided (e.g. by means of the feedback 308) to the network component 106b (e.g. to the precoder 302 of the network component 106c). Accordingly, the DL signal 108b transmitted from the network component 106b (the Tx) for a given plurality of data streams 208-1, 208-2 may be adapted (e.g. changed) based on channel state information 306 of the channel 201 (e.g. DL channel), e.g. to enhance throughput performance (e.g. total data throughput performance, e.g. total received data throughput performance at the terminal 102).

An uplink connection (e.g. from the terminal 102 to the network component 106b) may be bandwidth-limited. Accordingly, the channel state information 306 that may include the parameter (e.g. index) indicating which precoder matrix is determined, i.e. precoding matrix indicator, may take a finite discrete form (e.g. a finite number of bits). Consequently, a decision space of possible precoding matrices at the terminal 102 may be quantized and may be represented by a finite, though possibly large, number of candidate precoder matrices. The whole set of candidate precoder matrices (e.g. that a terminal 102 may search over) agreed by the network component and the terminal may also be referred to as a codebook.

The number of candidate precoding matrices, or the codebook size, may be a compromise between uplink load and a desired accuracy of the channel state information 306 that may include precoding matrix indicator. The codebook size can be large for radio communication systems or operation modes that may require an accurate determination of channel state information 306 and/or parameter (e.g. index), and hence, accurate precoding. This may be especially true in a radio communications system 104 having a large number of antennas at the network component 106b (the Tx) and/or a large number of antennas at the terminal 102 (the Rx). For example, transmission modes 9 and 10 in a 3GPP LTE (3rd Generation Partnership Project Long Term Evolution) system having eight transmit antennas at the network component 106b (the Tx) can have up to 621 candidate precoding matrices for the terminal 102 (the Rx) to search over. Such a large codebook size can translate to significant computation load on terminal 102 (the Rx), especially for a terminal with a tight limit on computational capacity and/or a tight power consumption budget. Accordingly, it is desirable to have a precoder search method with reduced computation complexity. For example, it may be desirable to have a precoder search method, by which the actual number of candidate precoding matrices searched over, i.e. the search set size, is less than the full codebook size.

Current methods for dealing with a large codebook size may be classified as either a joint Tx-Rx method (indicating that the network component 106b (the Tx) and the terminal 102 (the Rx) are involved in the method) or an Rx-only method (indicating that only the terminal 102 (the Rx) is involved in the method).

Joint Tx-Rx solutions may include precoder matrix construction methods. For example, these methods may provide way to construct candidate precoding matrices according to predetermined or prescribed rules. These methods for constructing candidate precoding matrices may allow efficient representation and feedback, and may utilize channel characteristics associated with precoding.

An effect of matrix-multiplication of a transmission signal vector (whose entries may include, or may be, the plurality of data streams 208-1, 208-2) with a precoding matrix on the channel 201 (e.g. DL channel) may be understood in terms of predetermined transmission directions that the network component 106b may be configured to transmit at.

Figure 4:
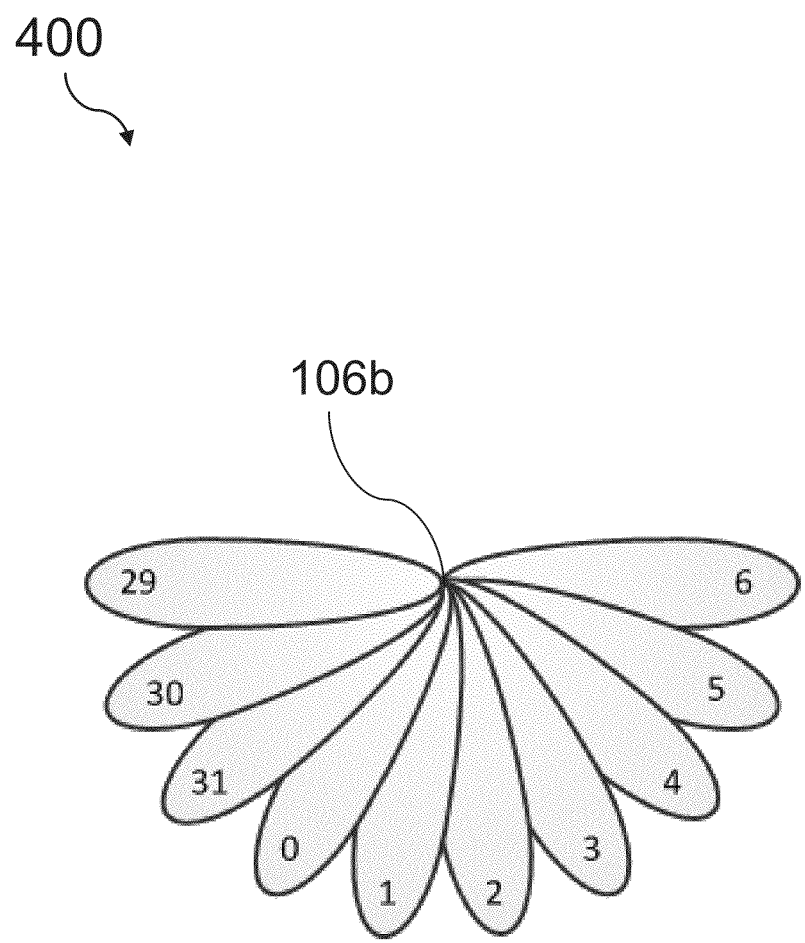

FIG. 4 shows a plurality of predetermined transmission spatial directions (indicated as reference signs 0 to 31) that the network component 106b may be configured to transmit at.

FIG. 4 may be a plan view 400 of the network component 106b, which is indicated as a point in FIG. 4. FIG. 4 may be a partial, not-to-scale representation of a group of 32 predetermined transmission directions spatially located laterally adjacent to each other. Only 32 predetermined transmission directions are shown as an example, however the number of predetermined transmission directions may be greater than 32, and may, for example, be in the range from about 30 to about 80, or in the range from about 80 to about 100, or greater than about 100 (e.g. greater than about 150, e.g. greater than about 200, etc.). In another example, the number of predetermined transmission directions may be less than 32, and may, for example, be in the range from about 5 to about 40.

A respective predetermined transmission direction of the plurality of predetermined transmission directions 0 to 31 may represent and/or may correspond to a respective beam (or lobe) of electromagnetic radiation radiated from the network component 106b in a respective direction. For example, the predetermined transmission direction 31 may represent a beam (or lobe) of electromagnetic radiation radiated from the network component 106b in a direction of a main lobe of the beam.

A respective predetermined transmission direction of the plurality of predetermined transmission directions 0 to 31 may represent and/or may correspond to a respective channel 201 (e.g. DL channel) between the network component 106b and the terminal 102 having a respective channel state. As described above, initial channel state information 306 may result in a selection of an initial precoding matrix. In relation to FIG. 4, initial channel state information 306 resulting in a selection of an initial precoding matrix may also result in a selection of an initial predetermined transmission direction from the plurality of transmission directions 0 to 31. A subsequent channel state information 306 (e.g. which may be different from the initial channel state information 306) resulting in a selection of a precoding matrix, which may be different from the initial precoding matrix, may also result in a selection of subsequent predetermined transmission direction from the plurality of transmission directions 0 to 31 that may be different from the initial predetermined transmission direction. Stated differently, a respective predetermined transmission direction of the plurality of predetermined transmission directions 0 to 31 may correspond to a respective precoding matrix.

As described above, joint Tx-Rx methods may utilize channel characteristics associated with precoding. For example, a channel parameter (e.g. a metric) of a first predetermined transmission direction may be correlated with the same channel parameter (e.g. same metric) of a second predetermined transmission direction which may be different from the first predetermined transmission direction. This correlation of a channel parameter (e.g. metric) of the first and second predetermined transmission directions may be referred to as channel correlation properties.

Channel correlation properties due to beamforming, in general, may exhibit spatial coherence, spectral coherence, and temporal coherence.

Spatial coherence may refer to an example where two values of a channel parameter (e.g. metric) corresponding to two spatially adjacent beams of electromagnetic radiation are at least substantially equal. In a channel exhibiting some degree of spatial coherence, the channel parameter (e.g. metric) may gradually change across beams of electromagnetic radiation that are laterally adjacent to each other. As an example, a channel parameter (e.g. metric) corresponding to predetermined transmission directions 1 and 2 (which may be spatially adjacent to each other) may be at least substantially equal. Furthermore, the channel parameter (e.g. metric) may gradually change across predetermined transmission directions 0 to 3, which may be laterally adjacent to each other. The example of predetermined transmission directions 0 to 3 is merely an example and not meant to be limiting. In general, a rate at which the channel parameter (e.g. metric) may change (e.g. gradually change) across predetermined transmission directions that are laterally adjacent to each other may depend on channel characteristics corresponding to the predetermined transmission directions that are laterally adjacent to each other.

In the example of spatial coherence, a channel parameter (e.g. metric) per predetermined transmission direction may not fluctuate drastically across adjacent predetermined transmission directions. Consequently, in case channel correlation properties exhibit spatial coherence, a predetermined transmission direction that may provide the best performance (e.g. throughput) among the predetermined transmission directions may have immediate neighbors that may provide little performance degradation (e.g. throughput degradation) compared to this optimal predetermined transmission direction that may provide the best performance (e.g. throughput).

Spectral coherence may refer to an example where a channel parameter (e.g. metric) may stay relatively constant over a contiguous spectrum of frequency. For example, in a channel exhibiting some degree of spectral coherence, a channel parameter (e.g. metric) of a first frequency or frequency band may be at least substantially equal to the channel parameter (e.g. same metric) of a second frequency or frequency band in case the first and second frequencies or frequency bands are within a sufficiently limited frequency interval. This frequency interval may, for example, be determined based on the channel coherence bandwidth of the channel.

Temporal coherence may refer to an example where a channel parameter (e.g. metric) may vary slowly in time. In other words, the channel parameter (e.g. metric) may remain relatively constant over a period of time. For example, in a channel exhibiting some degree of temporal coherence, a channel parameter (e.g. metric) at a first time may be at least substantially equal to the channel parameter (e.g. same metric) at a second time in case the first and second times are within a sufficiently limited time interval. This time interval may, for example, be determined based on the channel coherence time of the channel.

The extent of the spatial, spectral and/or temporal coherences may depend on a configuration of the plurality of antennas of the network component 106b and/or the terminal 102. Alternatively, or in addition, the extent of these coherences may depend on channel scattering characteristics of the radio communications system 104. For instance, such coherences (e.g. spatial, spectral and/or temporal coherences) may be significant in macro-cell downlinks, where network component 106b (e.g. Tx) (e.g. a base station) may face few nearby scatterers.

One class of joint Tx-Rx methods may make use of codebook structures that lend themselves well to efficient and effective interpolation over frequency, thus assuming spectral coherence of channel characteristics. In such a class of joint Tx-Rx methods, the terminal 102 (e.g. Rx) may conduct a search for a precoder matrix over a set of candidate precoder matrices defined for a subset (e.g. sparse subset) of frequencies (e.g. sub-carriers in multi-carrier systems). Consequently, the network component 106b (e.g. Tx) may reconstruct, via interpolation, precoder matrices for frequencies (e.g. sub-carriers) that are not included in the subset of frequencies over which the search was defined.

Another class of joint Tx-Rx methods may make use of codebook structures that exploit temporal coherence such that when only a part (e.g. a submatrix) of the optimal precoding matrix changes over time, only a partial update on the precoder matrix need be fed back by the terminal 102 (e.g. Rx) to the network component 106 (e.g. Tx). Joint Tx-Rx methods can reduce uplink feedback density over a given bandwidth and/or a period of time and/or reduce the size of the codebook for search instances where the terminal 102 (e.g. Rx) may make a partial decision on the precoding matrix.

An example of a radio communications system adopting joint Tx-Rx methods may be LTE. In LTE, transmission modes 9 and 10 may exploit the spectral and/or temporal coherence of cellular channels, e.g. by decoupling the precoder 302 into a first precoder and a second precoder. The first precoder may represent a group of predetermined transmission directions (e.g. a cluster of beams) selected from among the plurality of predetermined transmission directions 0 to 31 that may exhibit spectral and/or temporal coherence. A second precoder that may represent a predetermined transmission direction (e.g. a beam) selected from among the group of predetermined transmission directions (e.g. from along the cluster of beams) as well as a co-phasing factor. LTE specification may assume large spectral coherence, thereby defining feedback mechanisms of the first precoder for whole band only. LTE specification may also assume some degree of temporal coherence with respect to preferred cluster of beams, thereby supporting a feedback mechanism for updating the first precoder once per multiple feedback reports on second precoder.

Joint Tx-Rx solutions have several limitations. For example, since joint Tx-Rx methods affect both the network component 106b (e.g. Tx) and terminal 102 (e.g. Rx), these methods may only be applicable to communication systems employing specific predefined codebook(s) and predetermined feedback format(s) that may be known to both the network component 106b (e.g. Tx) and terminal 102 (e.g. Rx). By way of another example, joint Tx-Rx methods may not reduce the maximum precoder search set size for a particular frequency-time sample, at which a full decision is required. For instance, although LTE system may provide a framework to reduce the number of precoder searches over frequency and time, the worst-case (maximum) precoder search set is the full codebook. This maximum search set size may determine hardware size as well as computation time budget of a terminal 102 (e.g. Rx). Accordingly, joint Tx-Rx methods may not achieve the full degree of cost reduction, where the cost may be associated with hardware, computation complexity, etc.

Rx-only solutions may not make any assumption on codebook structure, and may limit the scope of the solution to constructing an effective and/or efficient precoder search at the terminal 102 (e.g. Rx). An example of Rx-only solutions may involve finding optimization criterions and decision metrics that may be amenable to efficient search methods. One such optimization criterion may be the chordal distance between a candidate precoding matrix and the optimum matrix (e.g. unquantized optimum matrix). In this example, the candidate precoding matrix with the minimum chordal distance may be selected as the precoding matrix. This approach may be applicable only within the context of a given criterion, and may be of limited value. For example, a need may arise in a terminal 102 (e.g. Rx) to employ a different criterion. For instance, in many radio communications systems, there may be channel state indicators (e.g. channel rank) other than precoding matrix, and it may be desirable that the terminal 102 (e.g. Rx) employ a unified criterion, and thus a joint metric, for optimizing over all the channel state indicators, instead of optimizing over a criterion specialized for precoding matrix.

In view of the above-mentioned features of current methods for dealing with a large codebook size, the following examples are desirable:

For example, a method for determining a transmission direction for a communication of a network component (e.g. the network component 106b) is provided. The method may be performed at a terminal (e.g. the terminal 102).

For example, a method for determining a transmission direction for a communication of a network component (e.g. the network component 106b) is provided. The method may reduce the maximum precoder search set size.

For example, a method for reducing the maximum precoder search set size is provided. The method may be independent of the codebook structure and/or the feedback format agreed between a terminal (e.g. the terminal 102) and the network component (e.g. the network component 106b).

For example, a method for reducing the maximum precoder search set size is provided. The method may be independent of optimization criterions and/or metrics.

As described above, a respective transmission direction may correspond to a respective precoding matrix. Consequently, determining a transmission direction for a communication of a network component may correspond to determining a precoding matrix for a communication of a network component.

Accordingly, for example, a method for determining a precoding matrix for a communication of a network component (e.g. the network component 106b) is provided. The method may be performed at a terminal (e.g. the terminal 102).

For example, a method for determining a precoding matrix for a communication of a network component (e.g. the network component 106b) based on a codebook including a plurality of candidate precoding matrices is provided. The method may reduce the maximum search set size.

For example, a method for reducing the maximum search set size is provided. The method may be independent of the codebook structure and/or the feedback format agreed between a terminal (e.g. the terminal 102) and the network component (e.g. the network component 106b).

For example, a method for reducing the maximum search set size is provided. The method may be independent of optimization criterions and/or metrics.

Figure 5:
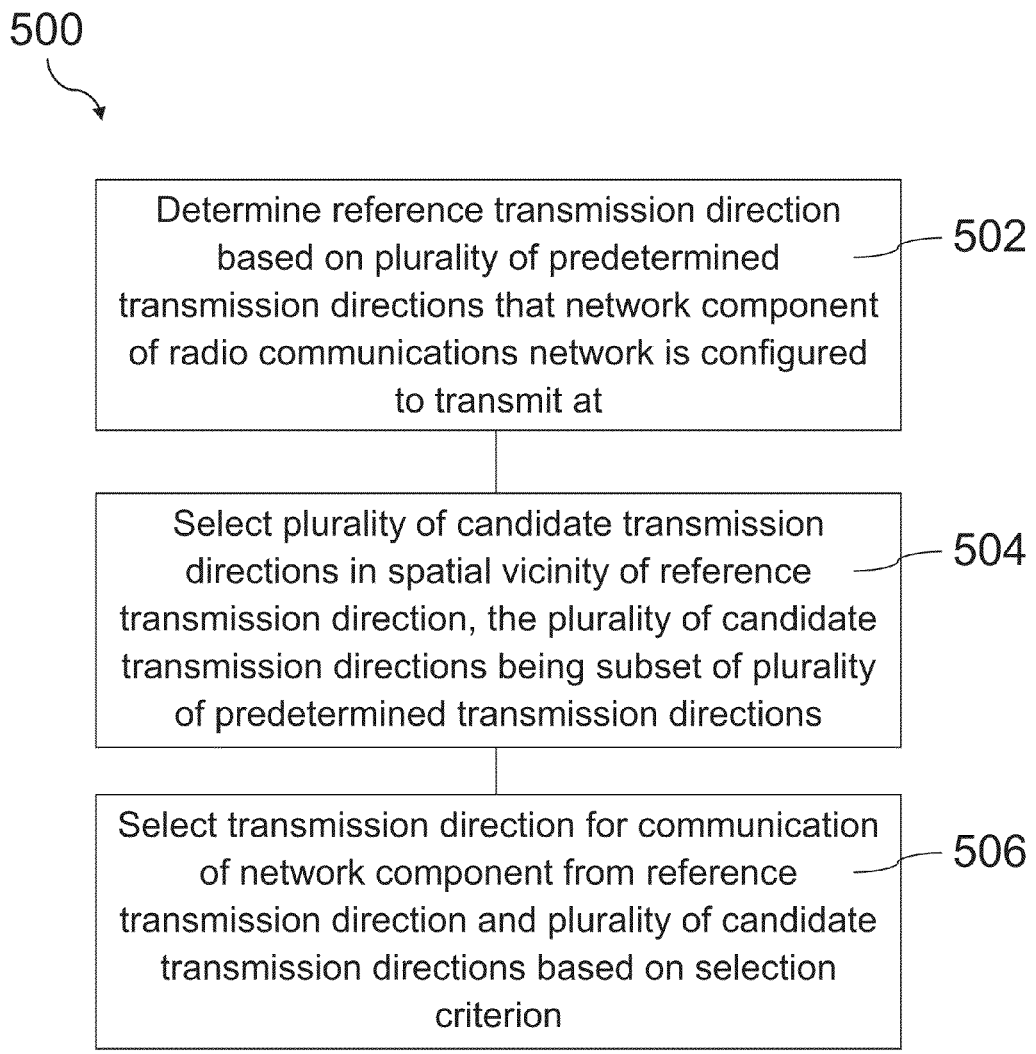
FIG. 5 shows a method for determining a transmission direction for a communication of a network component of a radio communications system.

FIG. 5 shows a method 500 for determining a transmission direction for a communication of a network component of a radio communications system.

The method 500 may include: determining a reference transmission direction based on a plurality of predetermined transmission directions that a network component of a radio communications network is configured to transmit at (in 502); selecting a plurality of candidate transmission directions in a spatial vicinity of the reference transmission direction, the plurality of candidate transmission directions being a subset of the plurality of predetermined transmission directions (in 504); and selecting a transmission direction for a communication of the network component from the reference transmission direction and the plurality of candidate transmission directions based on a selection criterion (in 506).

The method 500 may be performed at a terminal (e.g. the terminal 102).

The method 500 may reduce the. maximum precoder search set size.

The method 500 may be independent of the codebook structure and/or the feedback format agreed between a terminal (e.g. the terminal 102) and the network component (e.g. the network component 106b).

The method 500 may be independent of optimization criterions and/or metrics.

As described, the communication of the network component may include, or may be, a downlink communication of the network component to a terminal of the radio communications system (e.g. the terminal 102, as shown in FIG. 2). In other words, in the communication of the network component, the network component may be a transmitter (Tx) and a terminal of the radio communications system (e.g. terminal 102) may be a receiver (Rx).

FIG. 6A to FIG. 6D show an example of the method 500 shown in FIG. 5.

Figure 6A:
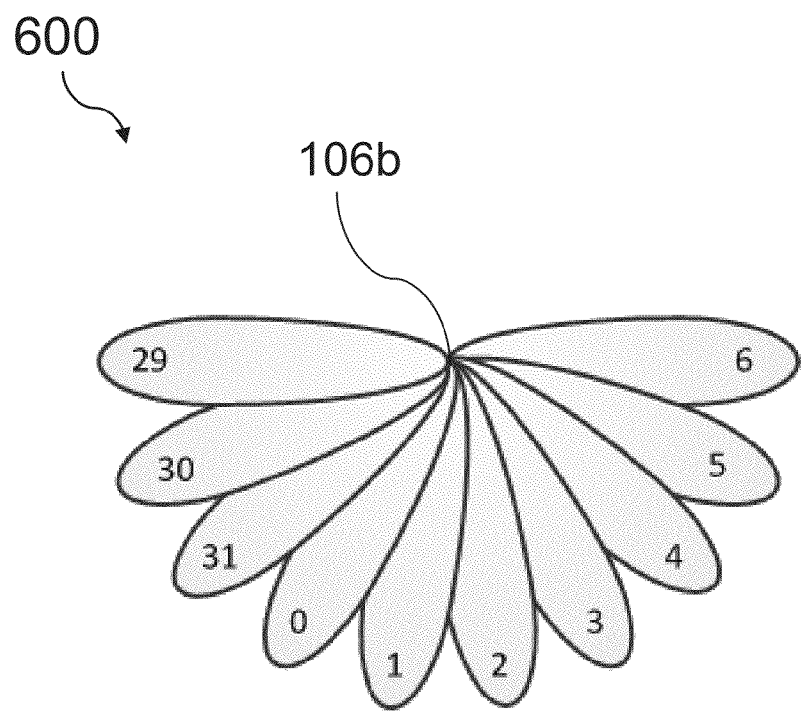
FIG. 6A to FIG. 6D show an example of the method shown in FIG. 5.

FIG. 6A shows a plan view 600 of a network component (e.g. the network component 106b) and illustrates a plurality of predetermined transmission spatial directions (indicated as reference signs 0 to 31) that the network component may be configured to transmit at.

Reference signs in FIG. 6A that are the same as in FIG. 4 denote the same or similar elements as in FIG. 4. Thus, those elements will not be described in detail again here; reference is made to the description above.

Figure 6B:
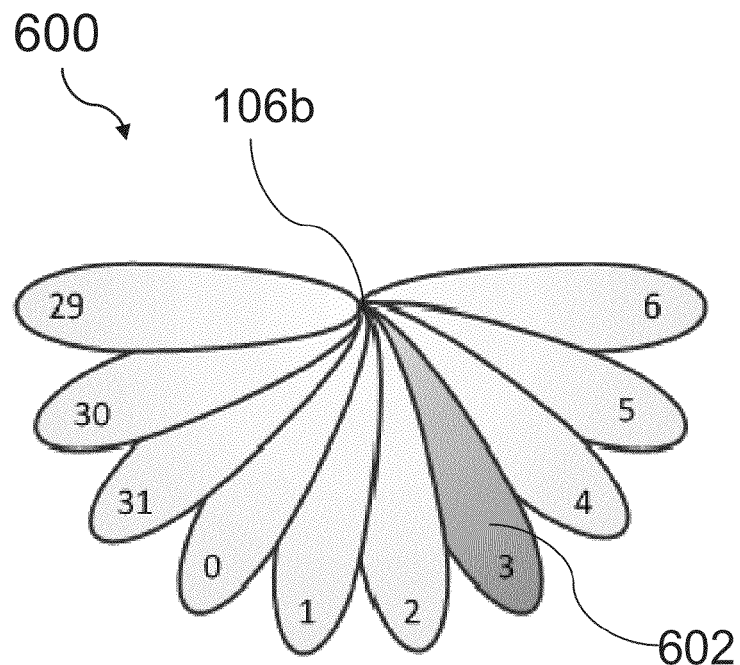

FIG. 6B shows a reference transmission direction 602 determined based on the plurality of predetermined transmission directions 0 to 31. For example, the reference transmission direction 602 may be selected from among the plurality of predetermined transmission directions 0 to 31. Only one reference transmission direction 602 is shown as an example. In another example, more than one reference transmission direction 602 may be determined. The illustration shown in FIG. 6B may, for example, be identified with "determining a reference transmission direction based on a plurality of predetermined transmission directions that a network component of a radio communications network is configured to transmit at" disclosed in 502 of method 500.

Figure 6C:
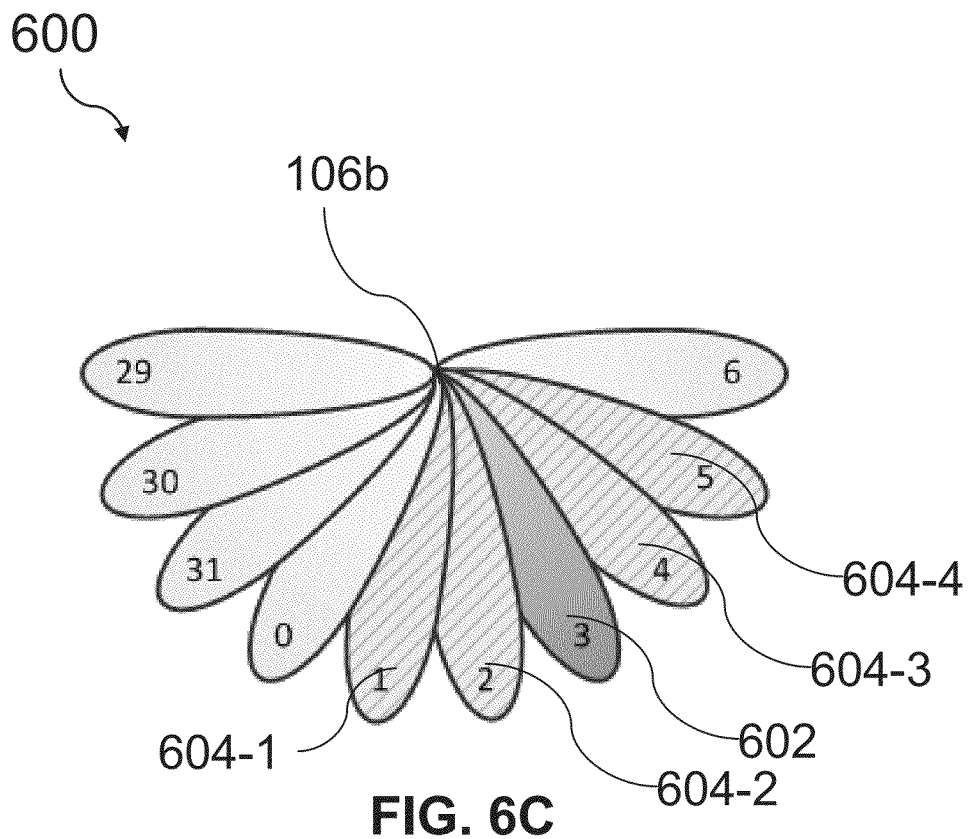

FIG. 6C shows a plurality of candidate transmission directions 604-1, 604-2, 604-3, 604-4 selected in a spatial vicinity of the reference transmission direction 602. Only four candidate transmission directions 604-1, 604-2, 604-3, 604-4 are shown as an example. In another example, more than four (or less than four) candidate transmission directions may be determined. The plurality of candidate transmission directions 604-1, 604-2, 604-3, 604-4 and the reference transmission direction 602 may be laterally adjacent to each other, as shown in FIG. 6C. As shown in FIG. 6C, the plurality of candidate transmission directions 604-1, 604-2, 604-3, 604-4 may be a subset (e.g. a proper subset) of the plurality of predetermined transmission directions 0 to 31. In other words, the plurality of candidate transmission directions 604-1, 604-2, 604-3, 604-4 may be selected from among the plurality of predetermined transmission directions 0 to 31. The illustration shown in FIG. 6C may, for example, be identified with "selecting a plurality of candidate transmission directions in a spatial vicinity of the reference transmission direction, the plurality of candidate transmission directions being a subset of the plurality of predetermined transmission directions" disclosed in 504 of method 500.

Figure 6D:
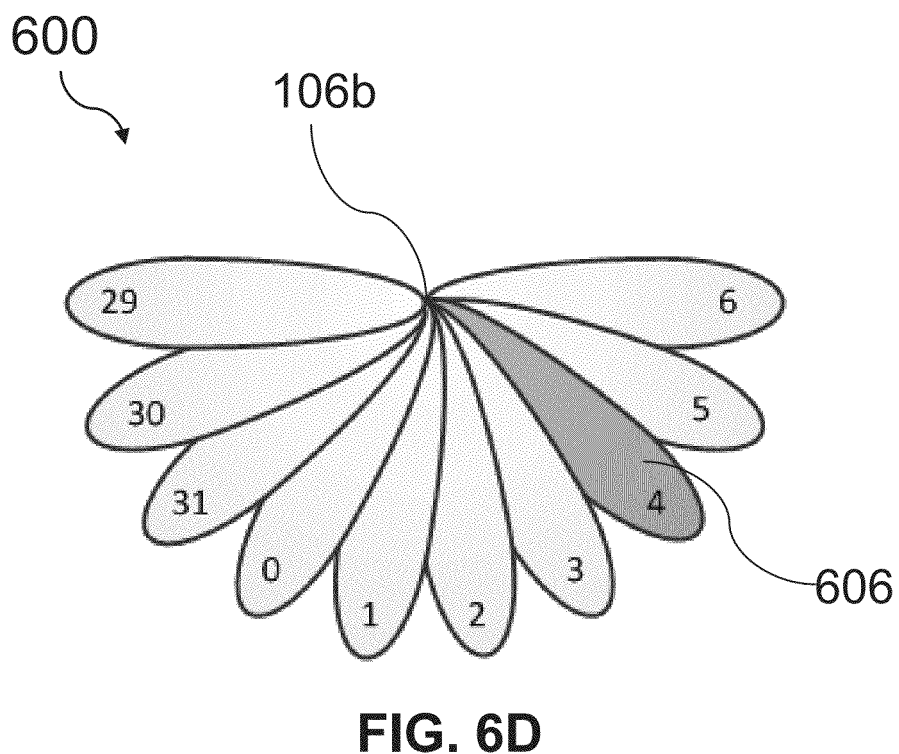

FIG. 6D shows that a transmission direction 606 may be selected from the reference transmission direction 602 and the plurality of candidate transmission directions 604-1, 604-2, 604-3, 604-4. In the example shown in FIG. 6D, the transmission direction 606 may be the candidate transmission direction 604-3. Only one transmission direction 606 is shown as an example. In another example, more than one transmission direction 606 may be determined. The transmission direction 606 may be selected based on a selection criterion and may be for a communication (e.g. a DL communication) of the network component (e.g. the network component 106b to the terminal 102, e.g. as shown in FIG. 3). The illustration shown in FIG. 6D may be identified with "selecting a transmission direction for a communication of the network component from the reference transmission direction and the plurality of candidate transmission directions based on a selection criterion" disclosed in 506 of method 500.

The method 500 may be based on spatial coherence of a channel. For example, selecting the plurality of candidate transmission directions 604-1, 604-2, 604-3, 604-4 in a spatial vicinity of the reference transmission direction 602 may be based on a spatial coherence of channel.

The method 500 may be further based on spectral and/or temporal coherence of a channel. For example, selecting the plurality of candidate transmission directions 604-1, 604-2, 604-3, 604-4 in a spatial vicinity of the reference transmission direction 602 may be based on a spatial coherence of a channel as well as a spectral and/or temporal coherence of the channel.

An effect provided by the method 500 may be reduction of the maximum search set size at each search instance (e.g. at each instance of a precoder matrix search). For example, the search for the transmission direction 606 may be performed on a reduced search set including the plurality of candidate transmission directions 604-1, 604-2, 604-3, 604-4 and the reference transmission direction 602, and not on the plurality of predetermined transmission directions 0 to 31.

The description that follows provides examples in the context of a radio communications system configured according to 3GPP LTE transmission modes 9 and 10, e.g. with eight antennas at the network component 106b (e.g. Tx) and two antennas at the terminal 102 (e.g. Rx) (which may be indicated as "LTE 8-Tx and 2-Rx downlink"). However, these examples are not meant to be limiting. A network component 106b (e.g. Tx) having a different number of antennas and/or a terminal 102 (e.g. Rx) having a different number of antennas may be possible in other examples as well.

In an LTE 8-Tx and 2-Rx downlink example, a codebook $C^{(v)}$ including candidate precoding matrices for mapping v data streams to the plurality of antennas 204a, 204b may equivalently be represented by two separate smaller codebooks $C_1^{(v)}$ and $C_2^{(v)}$. In the example shown in FIG. 3, v may be two since there are two data streams 208-1, 208-2. In another example, v may be one, or may be more than two. The total 8-Tx codebook C across all applicable number of layers may be represented as $\{C^{(1)}, C^{(2)}\}$.

A v-layer codebook $C^{(v)}$ for $v \in \{1,2\}$ may include 256 candidate precoding matrices of size 8×v. Hence the size of the total 8-Tx codebook C may be about 512.

A candidate precoder matrix may be represented as $W_{(i_1,i_2)}^{(v)}$, where $i_1 \in \{0, 1, \ldots, 15\}$ corresponds to the first precoding matrix indicator (PMI), $i_2 \in \{0, 1, \ldots, 15\}$ corresponds to the second precoding matrix indicator (PMI), and v is the number of layers. The candidate precoder matrix $W_{(i_1,i_2)}^{(v)}$ can also be represented in a two-stage format, namely: $W_{(i_1,i_2)}^{(v)} = W_{1,(i_1)}^{(v)} \cdot W_{2,(i_2)}^{(v)}$ The first stage $W_{1,(i_1)}^{(v)}$ may be referred to as the first precoding matrix and the second stage $W_{2,(i_2)}^{(1)}$ may be referred to as the second precoding matrix.

The first precoding matrix $W_{1,(i_1)}^{(v)}$ may be independent of the number of layers $v \in \{1,2\}$ and may be a 8×8 matrix that may model cluster of four predetermined transmission directions (e.g. corresponding to four beams, e.g. uniform linear array (ULA) beams), in the form of $$w_{1,(i_1)}^{(v)} = W_{1,(i_1)} = \begin{bmatrix} N_{(i_1)} & 0 \\ 0 & N_{(i_1)} \end{bmatrix},$$

where 0 denotes 4×4 all-zero matrix, $N_{(i_1)}$ is a 4×4 matrix satisfying:

$$N_{(i_1)} = [v_{mod(2i_1,32)} \, v_{mod(2i_1+1,32)} \, v_{mod(2i_1+2,32)} \, v_{mod(2i_1+3,32)}],$$

with the function mod(a, b) denoting modulus of integer a after division by integer b, and $v_m$, $m \in \{0, 1, \ldots, 31\}$, is 4×1 DFT-4 vector defined as $$v_m = \begin{bmatrix} e^{j\frac{2\pi \cdot 0 \cdot m}{32}} \\ e^{j\frac{2\pi \cdot 1 \cdot m}{32}} \\ e^{j\frac{2\pi \cdot 2 \cdot m}{32}} \\ e^{j\frac{2\pi \cdot 3 \cdot m}{32}} \end{bmatrix} = \begin{bmatrix} 1 \\ e^{j\frac{2\pi \cdot 1 \cdot m}{32}} \\ e^{j\frac{2\pi \cdot 2 \cdot m}{32}} \\ e^{j\frac{2\pi \cdot 3 \cdot m}{32}} \end{bmatrix}..$$

Thus, the first precoding matrix $W_{1,(i_1)}$ may share two of its four predetermined transmission directions with the first precoding matrix $W_{1,(mod(i_1-1,16))}$ and may share the other two with the first precoding matrix $W_{1,(mod(i_1+1,16))}$. In other words, a neighboring pair of first precoding matrices $\{W_{1,(mod(i_1,16))}, W_{1,(mod(i_1+1,16))}\}$ for any first PMI $i_1$ may partially overlap. This is further illustrated by way of an example in FIG. 7.

Figure 7:
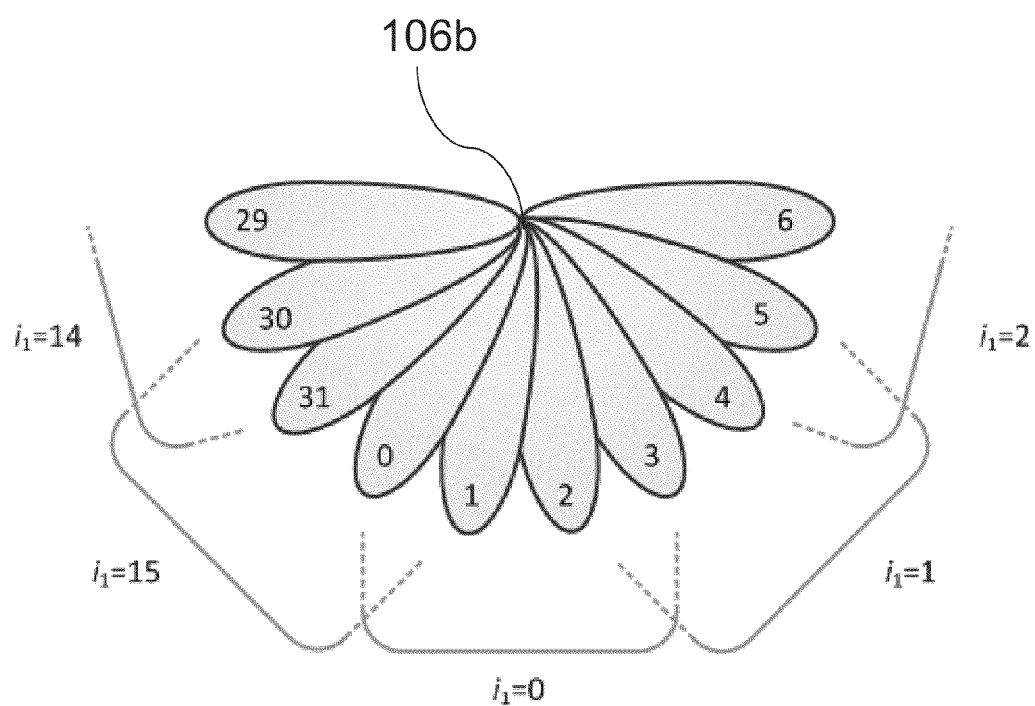
FIG. 7 shows a grouping of the plurality of predetermined transmission spatial directions into a plurality of transmission groups.

FIG. 7 shows a grouping of the plurality of predetermined transmission spatial directions 0 to 31 into a plurality of transmission groups, which may be referred to as a beam cluster (e.g. in LTE terminology).

Reference signs in FIG. 7 that are the same as in FIG. 4 denote the same or similar elements as in FIG. 4. Thus, those elements will not be described in detail again here; reference is made to the description above.

As described above, the first precoding matrix $W_{1,(i_1)}^{(v)}$ may be a 8×8 matrix that may model cluster of four predetermined transmission directions. In relation to FIG. 7, the first precoding matrix $W_{1,(i_1)}^{(v)}$ may model the grouping of the plurality of predetermined transmission directions 0 to 31 into a plurality of transmission groups, where each transmission group is indicated by a respective first PMI $i_1 \in \{0, 1, \ldots, 15\}$.

Each transmission group indicated (e.g. indicated by a respective first PMI $i_1 \in \{0, 1, \ldots, 15\}$) may include two or more predetermined transmission directions of the plurality of predetermined transmission directions 0 to 31. For example, the transmission groups corresponding to first PMIs $i_1=0$, $i_1=1$, and $i_1=15$ may include predetermined transmission directions $\{0,1,2,3\}$, $\{2,3,4,5\}$, and $\{30,31,0,1\}$, respectively.

As described above, a neighboring pair of first precoding matrices $\{W_{1,(mod(i_1,16))}, W_{1,(mod(i_1+1,16))}\}$ for any first PMI $i_1$ may partially overlap. In relation to FIG. 7, the transmission group corresponding to the first PMI $i_1=1$ may partially overlap with the transmission group corresponding to the first PMI $i_1=0$. For example, predetermined transmission directions 2 and 3 may belong to the transmission groups corresponding to first PMIs $i_1=0$ and $i_1=1$. In like manner, the transmission group corresponding to the first PMI $i_1=15$ may partially overlap with the transmission group corresponding to the first PMI $i_1=0$. For example, predetermined transmission directions 0 and 1 may belong to the transmission groups corresponding to first PMIs $i_1=0$ and $i_1=15$. Stated differently, a first transmission group (e.g. indicated by first PMI $i_1=0$) may be located next to and may partially overlap a second transmission group (e.g. indicated by first PMI $i_1=1$), and a predetermined transmission direction (e.g. predetermined direction 2) of the first transmission group (e.g. indicated by first PMI $i_1=0$) may be a predetermined transmission direction of the second transmission group (e.g. indicated by first PMI $i_1=1$).

The codebook for the first precoding matrix $W_{1,(i_1)}^{(v)}$ may be represented as $C_1 = \{W_{1,(0)}, W_{1,(1)}, \ldots, W_{1,(15)}\}$, and the maximum size of the codebook $C_1$ that the terminal 102 (e.g. a mobile station or a user equipment (UE) in LTE terminology) may have to generate may be equal to 16. It is again noted that the first precoding matrix $W_{1,(i_1)}^{(v)}$ may represent a transmission group including two or more predetermined transmission directions (e.g. including four predetermined transmission directions), the channel characteristics of which may exhibit spatial, temporal, and spectral coherence in typical cellular systems.

The second precoding matrix $W_{2,(i_2)}^{(v)}$ for $v=1$ may include, or may be, a 8×1 vector spanning selections (e.g. 4 selections) among the two or more predetermined transmission directions in a respective transmission group, e.g. indicated by a respective first PMI $i_1$). A second precoding matrix $W_{2,(i_2)}^{(v)}$ may also indicate a co-phasing hypothesis among a set of one or more co-phasing hypotheses (e.g. 4 QPSK co-phasing hypotheses in the LTE 8-Tx and 2-Rx downlink example). Specifically, $$w_{2,(i_2)}^{(1)} = \frac{1}{\sqrt{8 \cdot 1}} \begin{bmatrix} \delta_{\lfloor i_2/4 \rfloor} \\ \varphi_{mod(i_2,4)} \delta_{\lfloor i_2/4 \rfloor} \end{bmatrix},$$

where $\delta_i$ may be a selection vector defined as $$\delta_0 = \begin{bmatrix} 1 \\ 0 \\ 0 \\ 0 \end{bmatrix}, \delta_1 = \begin{bmatrix} 0 \\ 1 \\ 0 \\ 0 \end{bmatrix}, \delta_2 = \begin{bmatrix} 0 \\ 0 \\ 1 \\ 0 \end{bmatrix}, \delta_3 = \begin{bmatrix} 0 \\ 0 \\ 0 \\ 1 \end{bmatrix},$$

and $\phi_n$ is the co-phasing factor $$\varphi_n = e^{j\frac{\pi n}{2}}, n \in \{0, 1, 2, 3\}.$$

In case $v=1$, each transmission group may include 4 predetermined transmission directions. In such an example, a second PMI $i_2 \in \{0,1,2,3\}$, $i_2 \in \{4,5,6,7\}$, $i_2 \in \{8,9,10,11\}$, or $i_2 \in \{12,13,14,15\}$ may correspond to the selection of the first, second, third, or fourth predetermined transmission directions from the 4 predetermined transmission direction of the transmission group, respectively. In other words, there may be a predetermined mapping of the second PMI $i_2$ to a parameter (e.g. an index) indicating which of the two or more predetermined transmission directions of the transmission group may be for selection. This is further illustrated by way of the example in FIG. 7.

In the example shown in FIG. 7, the second PMI $i_2$ may be 5, and based on the mapping described above, a second PMI $i_2$ of 5 may correspond to the selection of the second predetermined transmission direction from the 4 predetermined transmission directions of a transmission group. In case the first PMI $i_1$ is 0, the predetermined transmission direction 1 may be selected from the two or more predetermined transmission directions 0 to 3 of the respective transmission group indicated by the first PMI $i_1=0$. By way of another example, the first PMI $i_1$ may be 15. In such an example, the predetermined transmission direction 31 may be selected from the two or more predetermined transmission directions 30, 31, 0 and 1 of the respective transmission indicated by the first PMI $i_1=15$.

The codebook for the second precoding matrix $W_{2,(i_2)}^{(v)}$ for v=1 may be represented as $$C_2^{(1)} = \left\{ \frac{1}{\sqrt{8}} \begin{bmatrix} \delta_{\lfloor i_2/4 \rfloor} \\ \delta_{\lfloor i_2/4 \rfloor} \end{bmatrix}, \frac{1}{\sqrt{8}} \begin{bmatrix} \delta_{\lfloor i_2/4 \rfloor} \\ j\delta_{\lfloor i_2/4 \rfloor} \end{bmatrix}, \frac{1}{\sqrt{8}} \begin{bmatrix} \delta_{\lfloor i_2/4 \rfloor} \\ -\delta_{\lfloor i_2/4 \rfloor} \end{bmatrix}, \frac{1}{\sqrt{8}} \begin{bmatrix} \delta_{\lfloor i_2/4 \rfloor} \\ -j\delta_{\lfloor i_2/4 \rfloor} \end{bmatrix} \right\}.$$

and the size of the codebook $C_2^{(1)}$ that the terminal 102 (e.g. a mobile station or a user equipment (UE) in LTE terminology) may have to generate may be equal to 16.

For v=2, one selection including two predetermined transmission directions may be made, one predetermined transmission direction for each layer, where each predetermined transmission direction may be one of the two or more predetermined transmission directions of a transmission group. $W_{2,(i_2)}^{(2)}$ may be a 8×2 matrix spanning 8 selections among candidate beams in a cluster and 2 QPSK co-phasing hypotheses, in the form of $$w_{2,(i_2)}^{(2)} = \frac{1}{\sqrt{8 \cdot 2}} \begin{bmatrix} \delta_m & \delta_{m'} \\ \varphi_{mod(i_2,2)} \delta_m & -\varphi_{mod(i_2,2)} \delta_{m'} \end{bmatrix},$$

where the indices m and m' may represent which of the two or more predetermined transmission directions of the transmission group may be for selection. As described above, there may be a predetermined mapping of the second PMI $i_2$ to a parameter (e.g. an index) indicating which of the two or more predetermined transmission directions of the transmission group may be for selection. For v=2, the indices m and m' may be determined from the second PMI $i_2$ according to the mapping shown in Table 1 below.

TABLE 1

Mappings of $i_2$ to m and m'

| $i_2$ | m | m' |
|---|---|---|
| 0, 1 | 0 | 0 |
| 2, 3 | 1 | 1 |
| 4, 5 | 2 | 2 |
| 6, 7 | 3 | 3 |
| 8, 9 | 0 | 1 |
| 10, 11 | 1 | 2 |
| 12, 13 | 0 | 3 |
| 14, 15 | 1 | 3 |

This may be further illustrated by way of the example in FIG. 7. Based on the mapping described above in Table 1, a second PMI $i_2$ of 5 may indicate a selection of a second predetermined transmission direction for both layers from the 4 predetermined transmission directions of a transmission group. In case the first PMI $i_1$ is 0, the predetermined transmission direction 1 may be selected for both layers from the transmission directions 0 to 3 of the respective transmission group indicated by the first PMI $i_1$=0. By way of another example, based on the mapping described above in Table 1, a second PMI $i_2$ of 9 may indicate a selection of the first and second predetermined transmission directions for the first and second layers, respectively, from the 4 predetermined transmission directions of a transmission group. In case the first PMI $i_1$ is 15, the predetermined transmission directions 30 and 31 may be selected for the first and second layers, respectively, from the transmission directions 30, 31, 0, and 1 of the respective transmission group indicated by the first PMI $i_1$=15.

The size of the codebook $C_2^{(2)}$ for the second precoding matrix $W_{2,(i_2)}^{(v)}$ for v=2 that the terminal 102 (e.g. a mobile station or a user equipment (UE) in LTE terminology) may have to generate may be equal to 16.

The size of the codebook for the second precoding matrix over the two rank candidates v=1 and v=2, $C_2 = \{C_2^{(1)}, C_2^{(2)}\}$, that the terminal 102 (e.g. a mobile station or a user equipment (UE) in LTE terminology) may have to generate may be equal to 32. It may be noted that the second precoding matrix $W_{2,(i_2)}^{(v)}$ may represent a selection of at least one predetermined transmission direction as well as a co-phasing configuration. Channel characteristics due to the latter in general may not exhibit large spatial nor temporal coherence, although significant coherences may arise in highly correlated propagation channels.

As described above, the full codebook may be represented as $$C = \{C^{(1)}, C^{(2)}\},$$

where $C^{(v)} \equiv \{W_{(i_1,i_2)}^{(v)} | i_1 = 0, 1, \ldots, 15, i_2 = 0, 1, \ldots, 15\}$. This codebook includes all possible combinations of elements of $C_1$ and $C_2^{(v)}$, and, hence, its size may be 16×32=512.

The two-stage structure of $W_{(i_1,i_2)}^{(v)}$, as described above in the context of codebook generation, may make the PMI search space $\{i_1, i_2\}^{(v)}$ amenable to efficient size reduction via a pre-selection of a part of $C_1$ (e.g. a subset of $C_1$) and a part of $C_2$ (e.g. a subset of $C_2$) based on effects of precoding on channel characteristics. The method 500 shown in FIG. 5 may exploit the two-stage structure of $W_{(i_1,i_2)}^{(v)}$ in this regard.

The method 500 may be performed at a target subframe, where a target subframe may be defined as the subframe designated by the network component 106b and/or the terminal 102 for determining the transmission direction for a communication of the network component 106b.

The method 500 may only exploit spatial coherence of channel characteristics of the plurality of predetermined transmission directions 0 to 31. This example may be referred to as a spatial sampling mode of the method 500. The method 500 may exploit spatial coherence and temporal coherence of channel characteristics of the plurality of predetermined transmission directions 0 to 31. This example may be referred to as a time tracking mode of the method 500. The method 500 may exploit spatial coherence and spectral coherence of channel characteristics of the plurality of predetermined transmission directions 0 to 31. This example may be referred to as a frequency tracking mode of the method 500. Each of these examples is presented below.

For the description that follows, the following notations and parameters may be used:

$\tilde{C} = \{\tilde{C}^{(1)}, \tilde{C}^{(2)}\}$ may denote a precoder search set having reduced size, and may be a subset of the full codebook $C = \{C^{(1)}, C^{(2)}\}$. This $\tilde{C} = \{\tilde{C}^{(1)}, \tilde{C}^{(2)}\}$ may also be referred to as a reduced search set.

$\tilde{W} = W_{1,(\tilde{i}_1)} \cdot W_{2,(\tilde{i}_2)}^{(\tilde{v})}$ may include, or may be, a previous transmission direction determined for a previous communication of the network component. The previous transmission direction $\tilde{W} = W_{1,(\tilde{i}_1)} \cdot W_{2,(\tilde{i}_2)}^{(\tilde{v})}$ may include a previously determined channel rank of $\tilde{v}$ (namely, a previous number of layers), a previously determined first PMI $\tilde{i}_1$, and a previously determined second PMI $\tilde{i}_2$.

The previous transmission direction $\tilde{W}$ may be within $N_{ct,\tilde{w}_1}$ subframes of the target subframe (namely, a time based on which the predetermined transmission direction for a communication of the network component is determined). The $N_{ct,\tilde{w}_1}$ subframes may be defined as the predetermined time interval (e.g. a predetermined number of subframes) after which the terminal 102 may invalidate the reduced PMI search space $\tilde{C}=\{\tilde{C}^{(1)}, \tilde{C}^{(2)}\}$. The $N_{ct,W_1}$ subframes may be determined based on the channel coherence time of a communications channel between the network component and a terminal. It is noted that different values of this parameter may be matched to various search subsets of the full codebook.

Parameter $i_{2,init}$ may include, or may be, a preset second PMI, which may be used as a parameter in case a previous transmission direction may not be available. The parameter may be used in case the method 500 exploits spatial coherence of channel characteristics only. The parameter $i_{2,init}$ may include, or may be, an index indicating which of the two or more predetermined transmission directions of a respective transmission group is for selection. The parameter $i_{2,init}$ may be a fixed parameter having a constant value or a variable parameter selected from a plurality of candidate values. In the LTE 8-Tx and 2-Rx downlink example, the plurality of candidate values may include, or may be, $\{0, \ldots, 15\}$. In case the parameter $i_{2,init}$ is a variable parameter, it may be randomly selected from the plurality of candidate values. Alternatively, the parameter may be selected from the plurality of candidate values based on a previously selected variable parameter (e.g. in a round-robin manner).

In general, the spatial sampling mode of the method 500 may include quantizing the spatial space spanned by the beams from precoding into a plurality of regions, such that each region includes one or more member beams. The spatial space may be quantized such that each region may be equally likely to have the optimum beam as its member. This quantization can be done off-line, and can be a part of system specification.

The spatial sampling mode of the method 500 may further include representing each region by one member beam and a fixed co-phasing factor. The co-phasing factor from the pool of all valid candidates can be randomly selected, chosen in a round-robin fashion, or fixed to a constant value. If the codebook has the same set of co-phasing factor for all beams, then choosing one factor for all beams can further reduce complexity.

The spatial sampling mode of the method 500 may further include selecting a candidate among the combinations of beams and co-phasing factors described above according to desired criterion and metric.

FIG. 8A to FIG. 8D show an example of the spatial sampling mode of the method 500 applied to the LTE 8-Tx and 2-Rx downlink example.

Spatial coherence may be exploited in case the target subframe may not have a previously reported $\tilde{W}$ within the above-described predetermined time interval.

As described above in relation to FIG. 5, the method 500 may include: determining a reference transmission direction based on a plurality of predetermined transmission directions that a network component of a radio communications network is configured to transmit at (in 502).

Figure 8A:
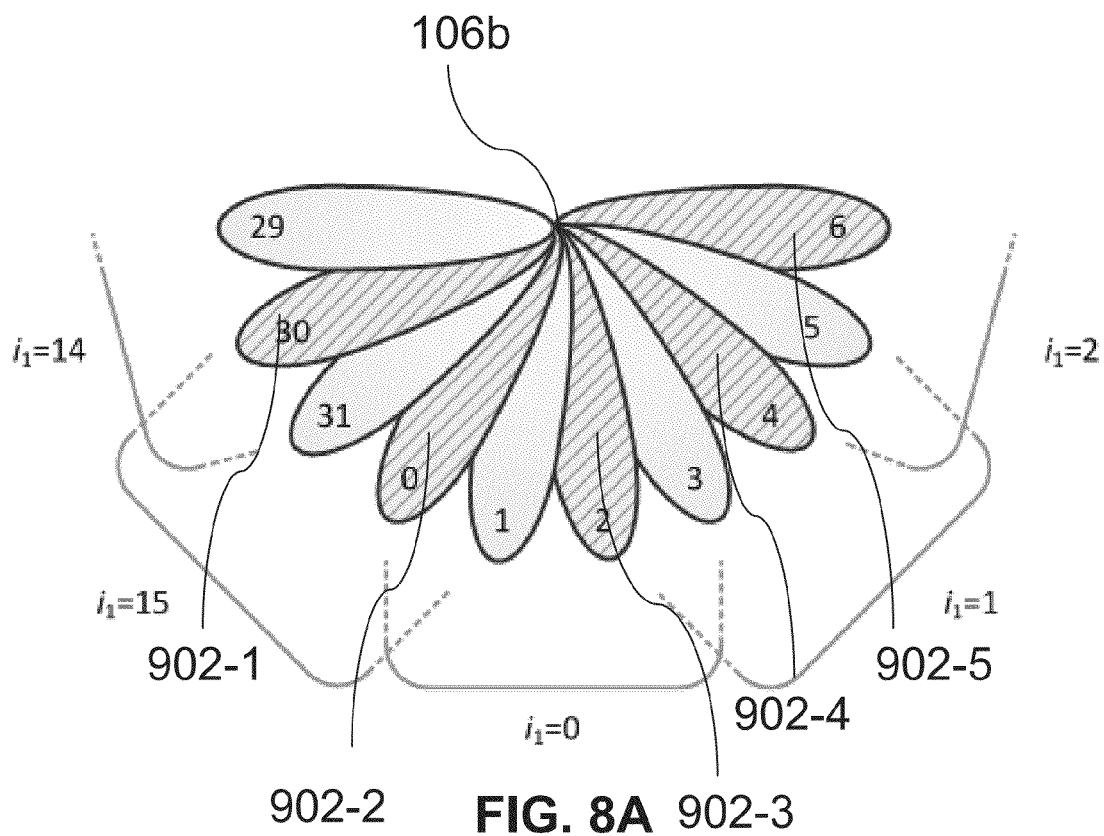
FIG. 8A to FIG. 8D show an example of the method shown in FIG. 5 that may only exploit spatial coherence of channel characteristics.
Figure 8B:
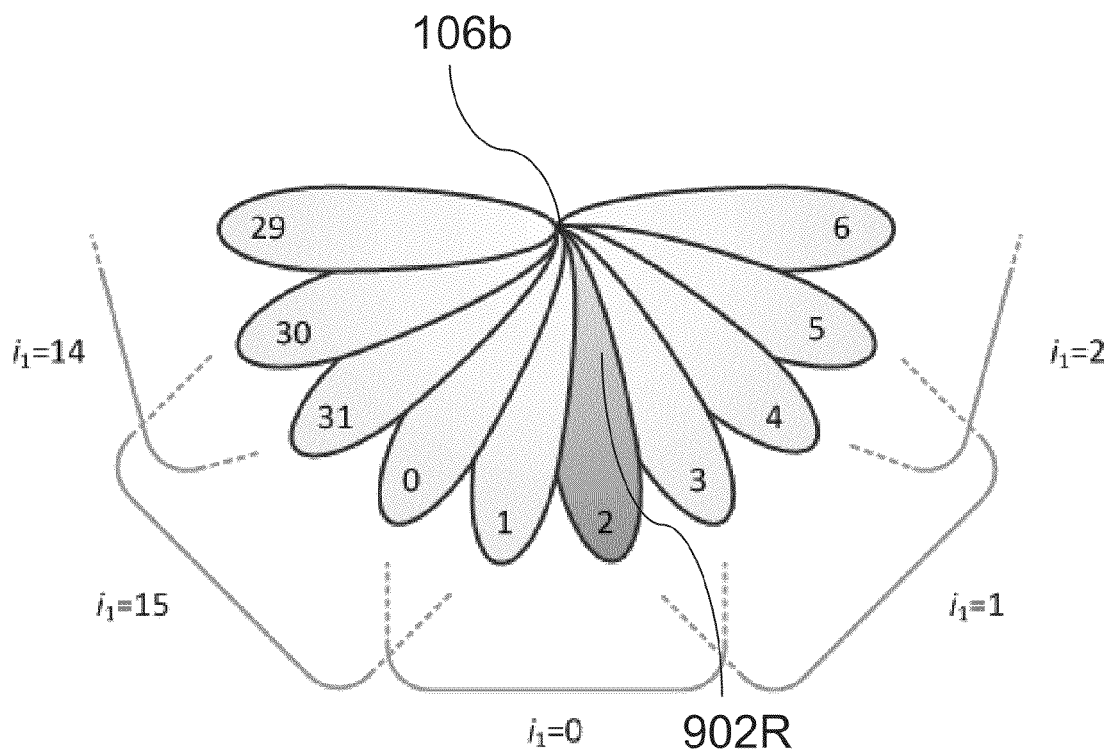

Determining the reference transmission direction (e.g. direction 902R shown in FIG. 8B) (e.g. in an example where the method 500 exploits only spatial coherence of channel characteristics of the plurality of predetermined transmission directions 0 to 31) may include determining a plurality of representative transmission directions 902-1 to 902-5 based on the plurality of predetermined transmission directions 0 to 31 (shown in FIG. 8A) and selecting the reference transmission direction 902R from the plurality of representative transmission directions 902-1 to 902-5 (shown in FIG. 8B).

As shown in FIG. 8A, determining the plurality of representative transmission directions 902-1 to 902-5 may include grouping the plurality of predetermined transmission directions 0 to 31 into the plurality of transmission groups indicated by the first PMI $i_1 \in \{0, 1, \ldots, 15\}$. This may be represented by the first precoding matrix $W_{1,(i_1)}^{(v)}$ as described above.

Determining the plurality of representative transmission directions 902-1 to 902-5 may further include selecting a respective representative transmission direction for a respective transmission group from the two or more predetermined transmission directions of the respective transmission group. This may be represented by the second precoding matrix $W_{2,(i_2)}^{(v)}$ as described above. In the example shown in FIG. 8A, the number of layers may be equal to 1, and the predetermined transmission direction 0 (indicated as representative transmission direction 902-2) may be selected as the representative transmission direction for the transmission group indicated by first PMI $i_1=0$, while predetermined transmission direction 2 (indicated as representative transmission direction 902-3) may be selected as the representative transmission direction for the transmission group indicated by first PMI $i_1=1$. The selection of respective representative transmission direction for a respective transmission group may be based on the parameter $i_{2,init}$ described above. For example, a respective transmission group may be represented by a predetermined transmission direction of the respective transmission group and a fixed co-phasing factor. For example, in the example shown in FIG. 8A, the parameter $i_{2,init}$ may be equal to 0.

As shown in FIG. 8B, the reference transmission direction 902R may be selected from the plurality of representative transmission directions 902-1 to 902-5. Selecting the reference transmission direction 902R may include determining which representative transmission direction of the plurality of representative transmission directions 902-1 to 902-5 satisfies the selection criterion, and selecting the determined transmission direction as the reference transmission direction 902R. The selection criterion may include, or may be, a maximization or minimization of a metric.

As described above in relation to FIG. 5, the method 500 may include: selecting a plurality of candidate transmission directions in a spatial vicinity of the reference transmission direction (in 504).

Figure 8C:
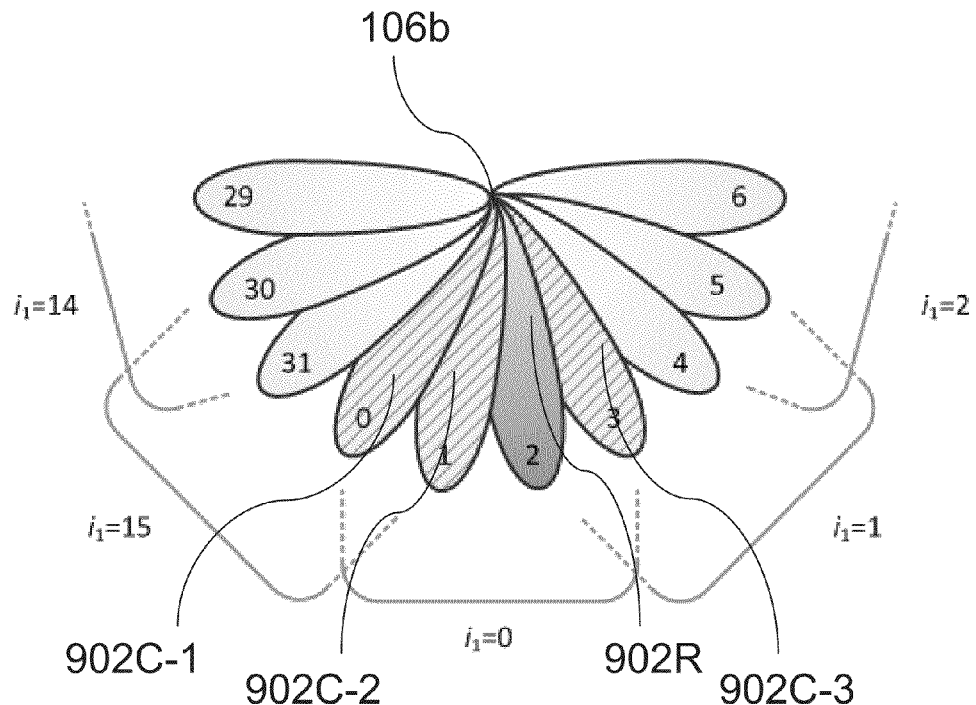

As shown in FIG. 8C, selecting the plurality of candidate transmission directions 902C-1 to 902-3 in a spatial vicinity of the reference transmission direction 902R may include selecting two or more predetermined transmission directions that may be spatially adjacent to (e.g. next to) the reference transmission direction 902R. For example, in the example shown in FIG. 8C, the predetermined transmission directions 1 and 3 may be selected, and may be included in the candidate transmission directions 902C-1 to 902C-3.

Selecting the plurality of candidate transmission directions 902C-1 to 902C-3 in a spatial vicinity of the reference transmission direction 902R may include selecting two or more predetermined transmission directions that may be within an angular neighborhood of the reference transmission direction 902R. In other words, the selected two or more predetermined transmission directions may correspond to angles of departures (AoDs) of electromagnetic waves that may be within an angular range from the AoD corresponding to the reference transmission direction 902R. This angular range may depend on the expected spatial coherence of the particular communication system. For example, in indoor communication systems (e.g. WiFi) where a DL transmitter often faces many nearby scatterers, the expected spatial coherence may be large and, hence, the angular range may be large. As an another example, in macro cellular systems where a DL transmitter often faces few nearby scatterers, the expected spatial coherence may be relatively small and, hence, the angular range may be small.

Selecting the plurality of candidate transmission directions 902C-1 to 902C-3 in a spatial vicinity of the reference transmission direction 902R may include determining the transmission group that includes the reference transmission direction 902R, and selecting the predetermined transmission directions of the determined transmission group other than the reference transmission direction 902R as the plurality of candidate transmission directions 902C-1 to 902C-3. For example, in FIG. 8C, the reference transmission direction 902R may be included in the transmission group indicated by first PMI $i_1=0$. Accordingly, predetermined transmission directions 0, 1, and 3 of this transmission group may be selected as the plurality of candidate transmission directions 902C-1 to 902C-3.

As described above in relation to FIG. 5, the method 500 may include: selecting a transmission direction for a communication of the network component from the reference transmission direction and the plurality of candidate transmission directions based on a selection criterion (in 506).

Figure 8D:
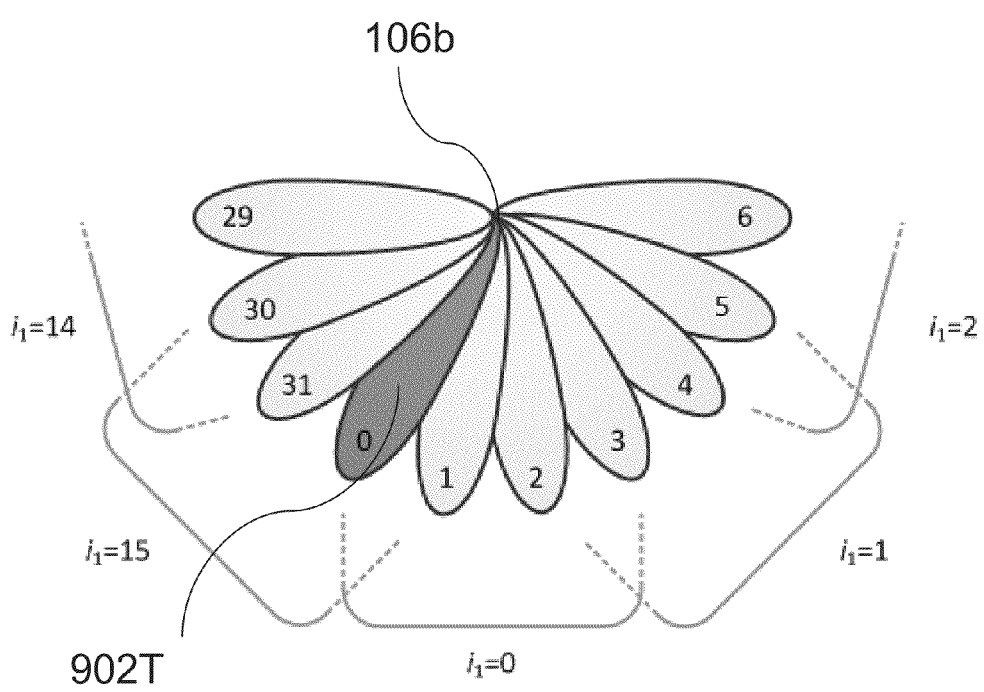

As shown in FIG. 8D, selecting the transmission direction 902T for a communication of the network component from the reference transmission direction 902R and the plurality of candidate transmission directions 902C-1 to 902C-3 may include: determining which transmission direction among the reference transmission direction 902R and the plurality of candidate transmission directions 902C-1 to 902C-3 satisfies the selection criterion; and selecting the transmission direction that satisfies the selection criterion as the transmission direction 902T. In the example shown in FIG. 8D, the candidate transmission direction 902C-1 (e.g. predetermined transmission direction 0) may be determined to satisfy the selection criterion (e.g. maximization or minimization of a metric). Accordingly, the candidate transmission direction 902C-1 (e.g. predetermined transmission direction 0) may be selected as the transmission direction 902T.

As described above, FIG. 8A to FIG. 8D show an example of the spatial sampling mode of the method 500. More specifically, it may be an example for layer $v=1$. Furthermore, it may be an example where a previous transmission direction $\tilde{W}=W_{1,(\tilde{i}_1)} \cdot W_{2,(\tilde{i}_2)}^{(\tilde{v})}$ may not be available. As described above, the previous transmission direction $\tilde{W}=W_{1,(\tilde{i}_1)} \cdot W_{2,(\tilde{i}_2)}^{(\tilde{v})}$ may include a previously determined channel rank of $\tilde{v}$ (namely, a previous number of layers), a previously determined first PMI $\tilde{v}_1$, and a previously determined second PMI $\tilde{i}_2$.

FIG. 8A to FIG. 8D may show an example of nested spatial sampling, with two nesting stages. The first nesting stage may be illustrated by FIG. 8A and FIG. 8B, while the second nesting stage may be illustrated by FIG. 8C and FIG. 8D. Depending on the codebook that a given communication system requires, there could be three or more stages of nesting, where a smaller subset of transmission directions may be focused on with a finer granularity of spatial sampling.

The following provides other examples, expressed mathematically using notation introduced above, of the spatial sampling mode of the method 500.

Spatial sampling mode: If a previous $\tilde{i}_1$ within $N_{ct,W_1}$ subframes is not available:

A. If rank (namely, number of layers v) is requested for the target subframe, $\tilde{C}=\{\tilde{C}^{(1)}, \tilde{C}^{(2)}\}$
  (i) First round (16 candidates per v)
    (a) Set $i_2=i_{2,init}$
    (b) Find $\tilde{i}_1$ via $\tilde{C}^{(v)}\equiv\{W_{(i_1,i_2)}^{(v)}|i_1\in\{0,\ldots,15\}, i_2=i_{2,init}\}$
  (ii) Second round (16 candidates per v)
    (a) Set $i_1=\tilde{i}_1$
    (b) Find $\tilde{i}_2$ via $\tilde{C}^{(v)}\equiv\{i_1, \tilde{i}_2\in\{0,\ldots,15\}\}$ B. If (rank(namely, number of layers v) is not requested) AND (first PMI is requested), $\tilde{C}=\tilde{C}^{(\tilde{v})}$
  (i) First round (16 candidates)
    (a) Let $v=\tilde{v}$
    (b) Find $\tilde{i}_1$ via $\tilde{C}^{(\tilde{v})}\equiv\{W_{i_1,i_2)}^{(\tilde{v})}|i_1\in\{0,\ldots,15\}, i_2=i_{2,init}\}$
  (ii) Second round (16 candidates)
    (a) Set $i_1=\tilde{i}_1$
    (b) Find $\tilde{i}_2$ via $\tilde{C}^{(\tilde{v})}\equiv\{W_{(i_1,i_2)}^{(\tilde{v})}|i_1=\tilde{i}_1, i_2\in\{0,\ldots,15\}\}$ As described above, the method 500 may exploit spatial coherence and temporal coherence of channel characteristics of the plurality of predetermined transmission directions 0 to 31 for determining a transmission direction of a communication of the network component 106b.

Temporal coherence may be exploited based on a previous transmission direction $\tilde{W}=W_{1,(\tilde{i}_1)}\cdot W_{2,(\tilde{i}_2)}^{(\tilde{v})}$ in case a time of determining the previous transmission direction is within a predetermined time interval from the target subframe. The predetermined time interval may be determined based on a channel coherence time of a communications channel between the network component 106b and a terminal of the radio communications network. Further, spatial coherence may be exploited by limiting the plurality of candidate transmission directions to the spatial vicinity of the previously determined first PMI $\tilde{i}_1$ of the previous transmission direction $\tilde{W}=W_{1,(\tilde{i}_1)}\cdot W_{2,(\tilde{i}_2)}^{(\tilde{v})}$.

For the description that follows, the following notations and parameters may be used:

$\tilde{C}_{\tilde{i}_1}^{(v)}\equiv\{W_{(i_1,i_2)}^{(v)}|i_1=\tilde{i}_1, i_2\in\{0,\ldots,15\}\}$ may include, or may be, a subset of the full codebook $C=\{C^{(1)}, C^{(2)}\}$, for any rank $v\in\{1,2\}$. This subset may correspond to the predetermined transmission directions of a previously determined transmission group indicated by the previously determined first PMI $\tilde{i}_1$, and may be of size 16 for each candidate rank $v=1$ and $v=2$.

$\tilde{C}_{\tilde{i}_1-1}^{(1)}\equiv\{W_{(i_1,i_2)}^{(1)}|i_1=\mathrm{mod}(\tilde{i}_1-1,16), i_2\in\{0,\ldots,7\}\}$ may include, or may be, a subset of the codebook C, for layer $v=1$. This subset may correspond to the predetermined transmission directions of a transmission group that may be located spatially adjacent to (e.g. next to) a previously determined transmission group indicated by the previously determined first PMI $\tilde{i}_1$ and may be of size 8 for layer $v=1$.

$\tilde{C}_{\tilde{i}_1+1}^{(1)}\equiv\{W_{(i_1,i_2)}^{(1)}|i_1=\mathrm{mod}(\tilde{i}_1+1,16), i_1\in\{8,\ldots,15\}\}$ may include, or may be, a subset of the codebook C, for layer $v=1$. This subset may correspond to the predetermined transmission directions of another transmission group that may be located spatially adjacent to (e.g. next to) a previously determined transmission group indicated by the previously determined first PMI $\tilde{i}_1$ and may be of size 8 for layer $v=1$.

$\tilde{C}_{\tilde{i}_1-1}^{(2)}\equiv\{W_{(i_1,i_2)}^{(2)}|i_1=\mathrm{mod}(\tilde{i}_1-1,16), i_2\in\{0,\ldots,3,8,\ldots,15\}\}$ may include, or may be, a subset of the codebook C, for layer $v=2$. This subset may correspond to the predetermined transmission directions of a transmission group that may be located spatially adjacent to (e.g. next to) a previously determined transmission group indicated by the previously determined first PMI $\tilde{i}_1$ and may be of size 12 for layer $v=2$.

$\tilde{C}_{\tilde{i}_1+1}^{(2)}\equiv\{W_{(i_1,i_2)}^{(2)}|i_1=\mathrm{mod}(\tilde{i}_1+1,16), i_2\in\{4,\ldots,15\}\}$ may include, or may be, a subset of the codebook C, for layer $v=2$. This subset may correspond to the predetermined transmission directions of another transmission group that may be located spatially adjacent to (e.g. next to) a previously determined transmission group indicated by the previously determined first PMI $\tilde{i}_1$ and may be of size 12 for layer $v=2$.

Figure 9A:
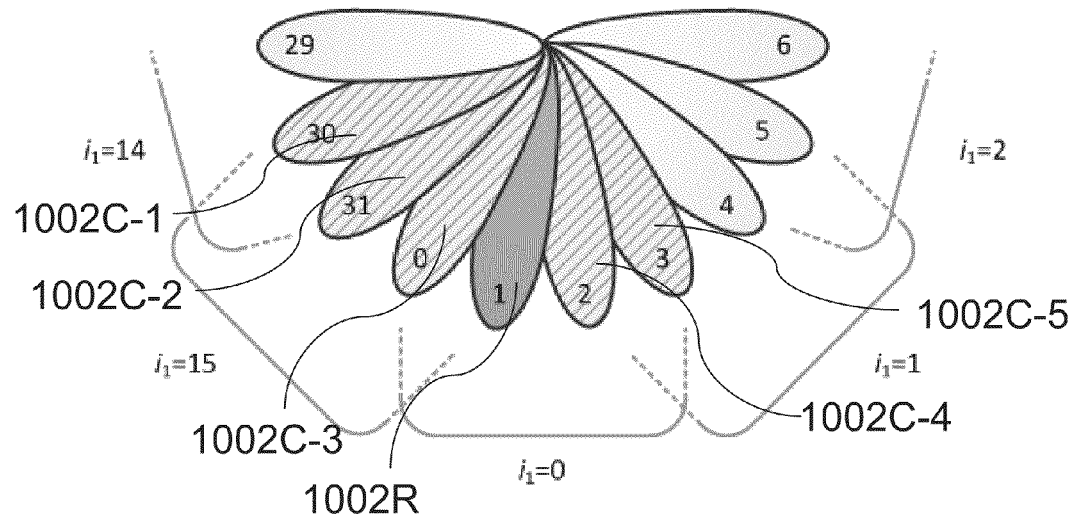
FIG. 9A and FIG. 9B show an example of the method shown in FIG. 5 that may exploit spatial coherence and temporal coherence of channel characteristics for one data layer.
Figure 9B:
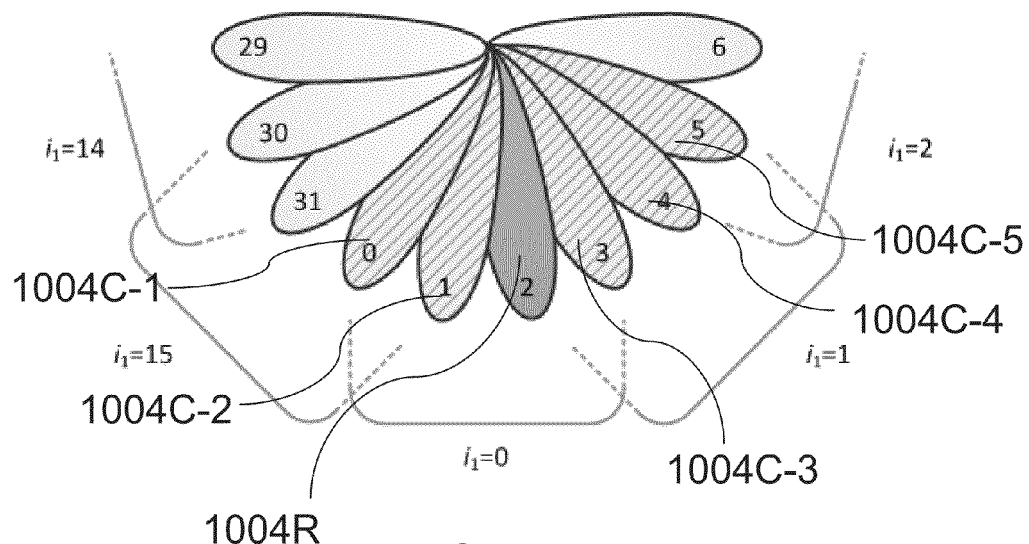

FIG. 9A and FIG. 9B show an example of the time tracking mode of the method 500 applied to the LTE 8-Tx and 2-Rx downlink example for $v=1$.

Figure 10A:
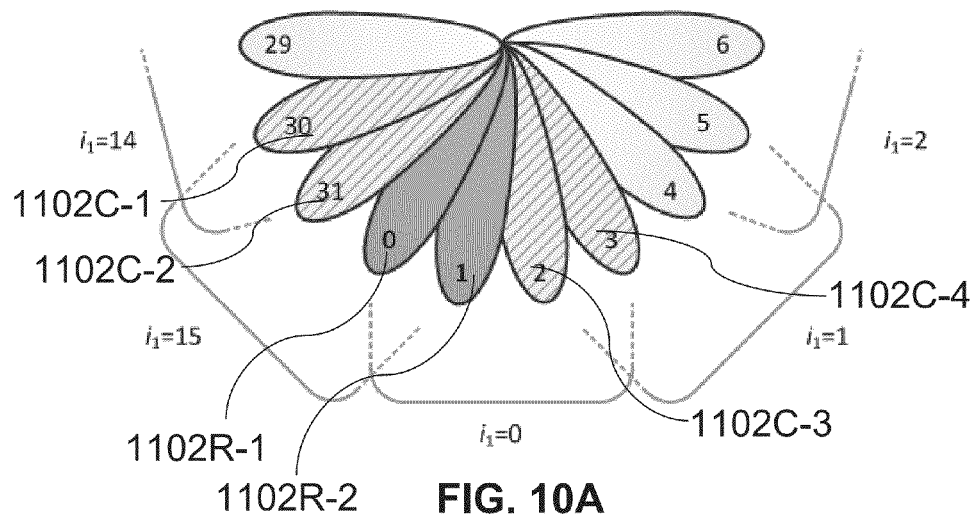
FIG. 10A and FIG. 10B show an example of the method shown in FIG. 5 that may exploit spatial coherence and temporal coherence of channel characteristics for two data layers.
Figure 10B:
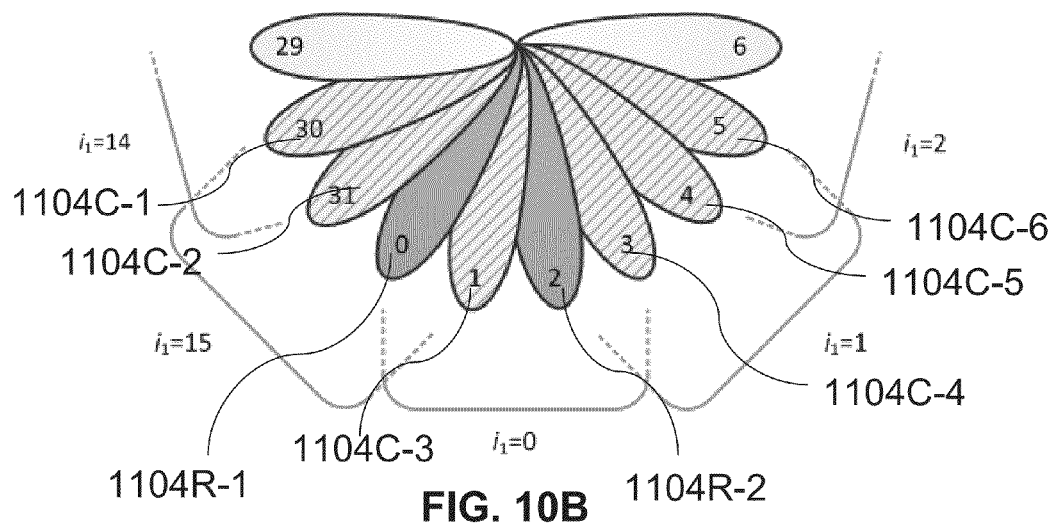

FIG. 10A and FIG. 10B show an example of time tracking mode of the method 500 applied to the LTE 8-Tx and 2-Rx downlink example for v=2.

As described above in relation to FIG. 5, the method 500 may include: determining a reference transmission direction based on a plurality of predetermined transmission directions that a network component of a radio communications network is configured to transmit at (in 502).

Determining the reference transmission direction (e.g. in an example where the method 500 exploits spatial coherence and temporal coherence of channel characteristics of the plurality of predetermined transmission directions 0 to 31) may include selecting a previous transmission direction determined for a previous communication of the network component in case the previous transmission direction satisfies a reference condition.

In the example shown in FIG. 9A (e.g. for the example of v=1), the previous transmission direction may include, or may be, the predetermined transmission direction 1. Accordingly, in this example, the reference transmission direction 1002R may include, or may be, the predetermined transmission direction 1. In the example shown in FIG. 9B (e.g. for the example of v=1), the previous transmission direction may include, or may be, the predetermined transmission direction 2. Accordingly, in this example, the reference transmission direction 1004R may include, or may be, the previous transmission direction 2.

In the example shown in FIG. 10A (e.g. for the example of v=2), the previous transmission directions may include, or may be, the predetermined transmission directions 0 and 1. Accordingly, in this example, the reference transmission directions 1102R-1, 1102R-2 may include, or may be, the previous transmission directions 0 and 1. In the example shown in FIG. 10B (e.g. for the example of v=2), the previous transmission directions may include, or may be, the predetermined transmission directions 0 and 2 Accordingly, in this example, the reference transmission directions 1104R-1, 1104R-2 may include, or may be, the previous transmission directions 0 and 2.

As described above, the previous transmission direction may be selected in case it satisfies a reference condition. The reference condition may include a time of determining the previous transmission direction being within the above-described predetermined time interval of a time of determining the transmission direction. For example, the predetermined time interval may be determined based on a channel coherence time of a communications channel between the network component and a terminal of the radio communications network. In an example where the reference condition may not be satisfied, the spatial sampling mode described above in relation to FIG. 8A to FIG. 8D may be used.

As described above in relation to FIG. 5, the method 500 may include: selecting a plurality of candidate transmission directions in a spatial vicinity of the reference transmission direction (in 504). In the example where method 500 may exploit spatial coherence and temporal coherence of channel characteristics, selecting the plurality of candidate transmission directions in the spatial vicinity of the reference transmission direction may include selecting two or more predetermined transmission directions that may be spatially adjacent to (e.g. next to) the reference transmission direction.

In the example shown in FIG. 9A (e.g. for the example of v=1), the predetermined transmission directions 0 and 2, which may be spatially adjacent to (e.g. next to) the reference transmission direction 1002R, may be selected, and may be included in the candidate transmission directions 1002C-1 to 1002C-5. In the example shown in FIG. 9B (e.g. for the example of v=1), the predetermined transmission directions 1 and 3, which may be spatially adjacent to (e.g. next to) the reference transmission direction 1004R, may be selected, and may be included in the candidate transmission directions 1004C-1 to 1004C-5.

In the example shown in FIG. 10A (e.g. for the example of v=2), the predetermined transmission directions 31 and 2, which may be spatially adjacent to (e.g. next to) the reference transmission direction 1102R-1, 1102R-2, may be selected, and may be included in the candidate transmission directions 1102C-1 to 1102C-4. In the example shown in FIG. 10B (e.g. for the example of v=2), the predetermined transmission directions 31, 1, and 3, which may be spatially adjacent to (e.g. next to) the reference transmission direction 1104R-1, 1104R-2, may be selected, and may be included in the candidate transmission directions 1104C-1 to 1104C-6.

Selecting the plurality of candidate transmission directions in a spatial vicinity of the reference transmission direction may include selecting two or more predetermined transmission directions that may be within an angular neighborhood of the reference transmission direction. In other words, the selected two or more predetermined transmission directions may correspond to AoDs of electromagnetic waves that may be within an angular range from the AoD corresponding to the reference transmission direction. This angular range may depend on the expected spatial coherence and expected channel coherence time of the particular communication system. For example, if the expected channel coherence time is large compared to the time difference between the reference transmission direction and the current selection, the angular range may be small. On the other hand, if the expected channel coherence time is small compared to the time difference between the reference transmission direction and the current selection, the angular range may be large.

Selecting the plurality of candidate transmission directions in a spatial vicinity of the reference transmission direction may, for example, include determining the transmission group that may include the reference transmission direction, and selecting the predetermined transmission directions of the determined transmission group other than the reference transmission direction as the plurality of candidate transmission directions. In another example, the predetermined transmission directions of a transmission group adjacent to the determined transmission group may be selected (e.g. in case adjacent transmission groups do not overlap). In other words, at least a part of a transmission group adjacent to the determined transmission group may be selected.

In FIG. 9A (e.g. for the example of v=1), the reference transmission direction 1002R may be included in the transmission groups indicated by first PMI $i_1$=0 and $i_1$=15. This may be a consequence for adjacent transmission groups partially overlapping, as described above. Accordingly, predetermined transmission directions 30, 31, 0, 2, and 3 of these transmission groups may be selected, and may be included in the plurality of candidate transmission directions 1002C-1 to 1002C-5. In the example shown in FIG. 9B (e.g. for the example of v=1), the reference transmission direction 1004R may be included in the transmission groups indicated by first PMI $i_1$=0 and $i_1$=1. Accordingly, predetermined transmission directions 0, 1, 3, 4, and 5 of these transmission groups may be selected, and may be included in the plurality of candidate transmission directions 1004C-1 to 1004C-5. While FIG. 9A and FIG. 9B may show examples where adjacent transmission groups partially overlap, it is reiterated that at least a part of a transmission group adjacent to the determined transmission group may be included in the selection.

In the example shown in FIG. 10A (e.g. for the example of v=2), the reference transmission direction 1102R-1, 1102R-2 may be included in the transmission group indicated by first PMI $i_1=0$ and $i_1=15$. Accordingly, predetermined transmission directions 30, 31, 2, and 3 of these transmission groups may be selected, and may be included in the plurality of candidate transmission directions 1102C-1 to 1102C-4. In the example shown in FIG. 10B (e.g. for the example of v=2), the reference transmission direction 1104R-1, 1104R-2 may be included in the transmission group indicated by first PMI $i_1=0$, $i_1=15$ and $i_1=1$. Accordingly, predetermined transmission directions 30, 31, 1, 3, 4, and 5 of these transmission groups may be selected, and may be included in the plurality of candidate transmission directions 1104C-1 to 1104C-6.

As described above in relation to FIG. 5, the method 500 may include: selecting a transmission direction for a communication of the network component from the reference transmission direction and the plurality of candidate transmission directions based on a selection criterion (in 506).

In the examples shown in FIG. 9A, FIG. 9B, FIG. 10A and FIG. 10B, selecting the transmission direction may include: determining which transmission direction among the reference transmission direction and the plurality of candidate transmission directions shown in the respective figures satisfies the selection criterion; and selecting the transmission direction that satisfies the selection criterion as the transmission direction. In the examples shown in FIG. 9A and FIG. 9B, (e.g. for the example of v=1), one transmission direction may be determined. In the examples shown in FIG. 10A and FIG. 10B, (e.g. for the example of v=2), one transmission direction may be determined for each layer.

The following provides other examples, expressed mathematically using notation introduced above, of the time tracking mode of the method 500.

Time tracking mode: If a previous $\tilde{i}_1$ within $N_{ct,W_1}$ subframes is available:

A. If rank (namely, number of layers v) is requested for the target subframe, $\tilde{C}=\{\tilde{C}^{(1)}, \tilde{C}^{(2)}\}$, where
  (i) For v=1: (24 candidates)
   (a) If $\tilde{i}_2 \in \{0, 1, \ldots, 7\}$, $\tilde{C}^{(1)}=\{\tilde{C}_{\tilde{i}_1-1}^{(1)}, \tilde{C}_{\tilde{i}_1}^{(1)}\}$
   (b) Else ($\tilde{i}_2 \in \{8, 9, \ldots, 15\}$), $\tilde{C}^{(1)}=\{\tilde{C}_{\tilde{i}_1}^{(1)}, \tilde{C}_{\tilde{i}_1+1}^{(1)}\}$
  (ii) For v=2: (28 or 40 candidates)
   (a) If $\tilde{i}_2 \in \{0,1,2,3\}$, $\tilde{C}^{(2)}=\{\tilde{C}_{\tilde{i}_1-1}^{(2)}, \tilde{C}_{\tilde{i}_1}^{(2)}\}$
   (b) Else if $\tilde{i}_2 \in \{4,5,6,7\}$, $\tilde{C}^{(2)}=\{\tilde{C}_{\tilde{i}_1}^{(2)}, \tilde{C}_{\tilde{i}_1+1}^{(2)}\}$
   (c) Else ($\tilde{i}_2 \in \{8, 9, \ldots, 15\}$), $\tilde{C}^{(2)}=\{\tilde{C}_{\tilde{i}_1-1}^{(2)}, \tilde{C}_{\tilde{i}_1}^{(2)}, \tilde{C}_{\tilde{i}_1+1}^{(2)}\}$
B. If (rank (namely, number of layers v) is not requested) AND (first PMI is requested)
  (i) If $\tilde{v}=1$, $\tilde{C}=\tilde{C}^{(1)}$ (24 candidates)
   (a) If $\tilde{i}_2 \in \{0, 1, \ldots, 7\}$, $\tilde{C}^{(1)}=\{\tilde{C}_{\tilde{i}_1-1}^{(1)}, \tilde{C}_{\tilde{i}_1}^{(1)}\}$
   (b) Else ($\tilde{i}_2 \in \{8, 9, \ldots, 15\}$), $\tilde{C}^{(1)}=\{\tilde{C}_{\tilde{i}_1}^{(1)}, \tilde{C}_{\tilde{i}_1+1}^{(1)}\}$
  (ii) If $\tilde{v}=2$, $\tilde{C}=\tilde{C}^{(2)}$ (28 or 40 candidates)
   (a) If $\tilde{i}_2 \in \{0,1,2,3\}$, $\tilde{C}^{(2)}=\{\tilde{C}_{\tilde{i}_1-1}^{(2)}, \tilde{C}_{\tilde{i}_1}^{(2)}\}$
   (b) Else if $\tilde{i}_2 \in \{4,5,6,7\}$, $\tilde{C}^{(2)}=\{\tilde{C}_{\tilde{i}_1}^{(2)}, \tilde{C}_{\tilde{i}_1+1}^{(2)}\}$
   (c) Else ($\tilde{i}_2 \in \{8, 9, \ldots, 15\}$), $\tilde{C}^{(2)}=\{\tilde{C}_{\tilde{i}_1-1}^{(2)}, \tilde{C}_{\tilde{i}_1}^{(2)}, \tilde{C}_{\tilde{i}_1+1}^{(2)}\}$
C. If (rank (namely, number of layers v) is not requested) AND (only second PMI is requested) (i) $\tilde{C}=\tilde{C}^{(\tilde{v})}=\tilde{C}_{\tilde{i}_1}^{(\tilde{v})}$ (16 candidates)

Table 2 shown below summarizes a number of optimization metric calculations needed for a target subframe and a target resource element, summed across the number of layers. The numbers for time-tracking mode may depend on channel rank and previously determined transmission direction. The row indicating "full search" may, for example, correspond to the maximum search set size for currently available methods. As seen in Table 2, a significant reduction in a maximum size of a precoder search set may be provided by the method 500 shown in FIG. 5.

TABLE 2

Number of precoding matrices considered in a PMI search

| method | unconstrained | known rank | known $i_1$ |
|---|---|---|---|
| full search | 512 | 256 | 16 |
| spatial sampling | 2(16 + 16) = 64 | 16 + 16 = 32 | 16 |
| time tracking | 24 + 28 = 52 or 24 + 40 = 64 | 24 or 28 or 40 | 16 |

As described above, the method 500 may exploit spatial coherence and spectral coherence of channel characteristics of the plurality of predetermined transmission directions 0 to 31 for determining a transmission direction of a communication of the network component 106b. The method 500 in such an example may also be referred to as a frequency tracking mode of the method 500.

The frequency tracking mode of the method 500 can be implemented in a similar fashion as the time-tracking mode. For example, as described above, the previous transmission direction may be selected in case it satisfies a reference condition. The reference condition may include a frequency band of the previous communication being within a predetermined frequency interval from a frequency band of the target communication, e.g. the communication for which PMI is to be determined. For example, the predetermined frequency interval may be determined based on a channel coherence bandwidth of a communications channel between the network component and a terminal of the radio communications network. In an example where the reference condition may not be satisfied, the spatial sampling mode described above in relation to FIG. 8A to FIG. 8D may be used. It may also be noted that the time tracking mode and the frequency tracking mode may be combined. In such an example, the method 500 may exploit spatial coherence, time coherence, and spectral coherence of channel characteristics of the plurality of predetermined transmission directions 0 to 31 for determining a transmission direction of a communication of the network component 106b.

Figure 11:
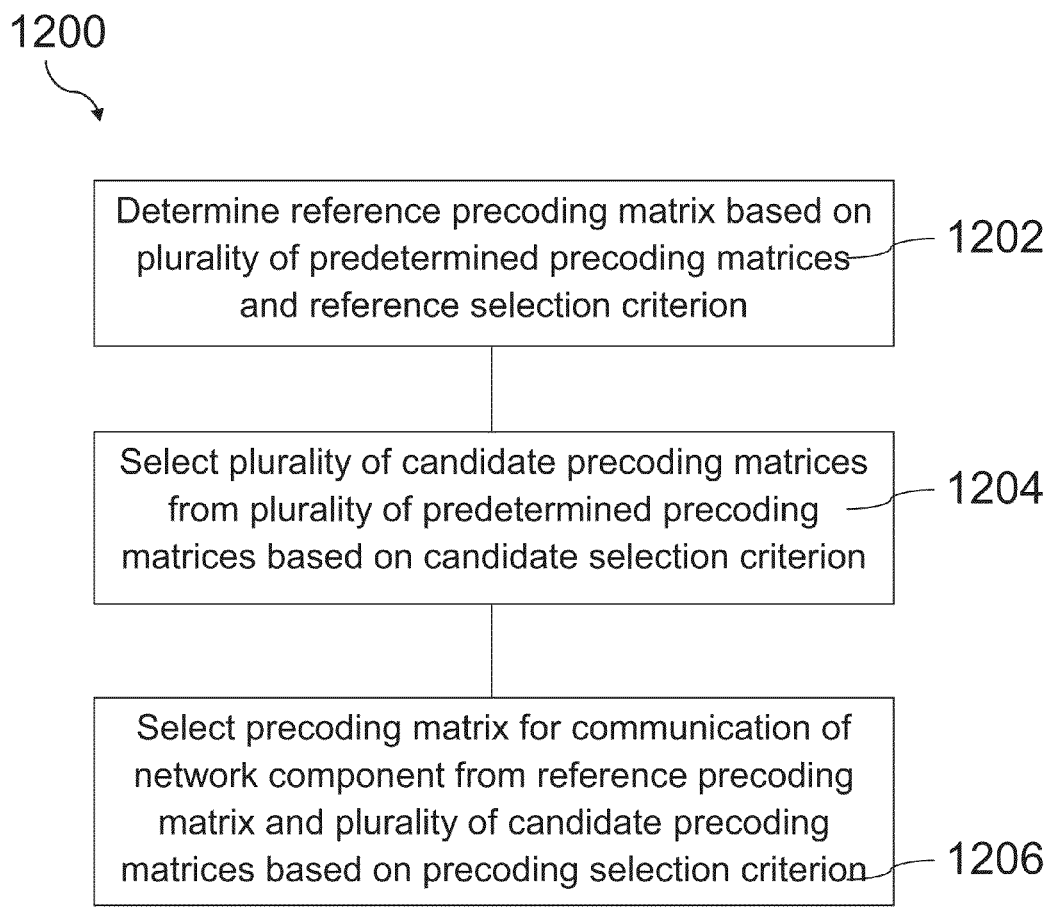
FIG. 11 shows a method for determining a precoding matrix for a communication of a network component of a radio communications network.

FIG. 11 shows a method 1200 for determining a precoding matrix for a communication of a network component of a radio communications network.

The method 1200 may include: determining a reference precoding matrix based on a plurality of predetermined precoding matrices and a reference selection criterion (in 1202); selecting a plurality of candidate precoding matrices from the plurality of predetermined precoding matrices based on a candidate selection criterion (in 1204); and selecting a precoding matrix for a communication of the network component from the reference precoding matrix and the plurality of candidate precoding matrices based on a precoding selection criterion (in 1206).

As described above, a respective predetermined transmission direction of the plurality of predetermined transmission directions may correspond to a respective precoding matrix for mapping a transmission signal vector to the plurality of antennas. Accordingly, "determining a reference precoding matrix based on a plurality of predetermined precoding matrices and a reference selection criterion" disclosed in 1202 of method 1200 may correspond to "determining a reference transmission direction based on a plurality of predetermined transmission directions that a network component of a radio communications network is configured to transmit at" disclosed in 502 of method 500.

In like manner, "selecting a plurality of candidate precoding matrices from the plurality of predetermined precoding matrices based on a candidate selection criterion" disclosed in 1204 of method 1200 may correspond to "selecting a plurality of candidate transmission directions in a spatial vicinity of the reference transmission direction, the plurality of candidate transmission directions being a subset of the plurality of predetermined transmission directions" disclosed in 504 of method 500. The candidate selection criterion may, for example, include, or may be, the selected candidate transmission directions corresponding to predetermined transmission directions that may be in a spatial vicinity of the reference transmission direction corresponding to the reference precoding matrix.

In a similar manner, "selecting a precoding matrix for a communication of the network component from the reference precoding matrix and the plurality of candidate precoding matrices based on a precoding selection criterion" disclosed in 1206 of method 1200 may correspond to "selecting a transmission direction for a communication of the network component from the reference transmission direction and the plurality of candidate transmission directions based on a selection criterion" disclosed in 506 of method 500.

Various examples and aspects described in the context of the method 500 may be analogously valid for the method 1200.

The method 1200 may be performed at a terminal (e.g. the terminal 102).

The method 1200 may have a reduced maximum precoder search set size.

The method 1200 may be independent of a codebook structure and/or a feedback format between a terminal (e.g. the terminal 102) and the network component (e.g. the network component 106b).

The method 1200 may be independent of optimization criterions and/or metrics.

Figure 12:
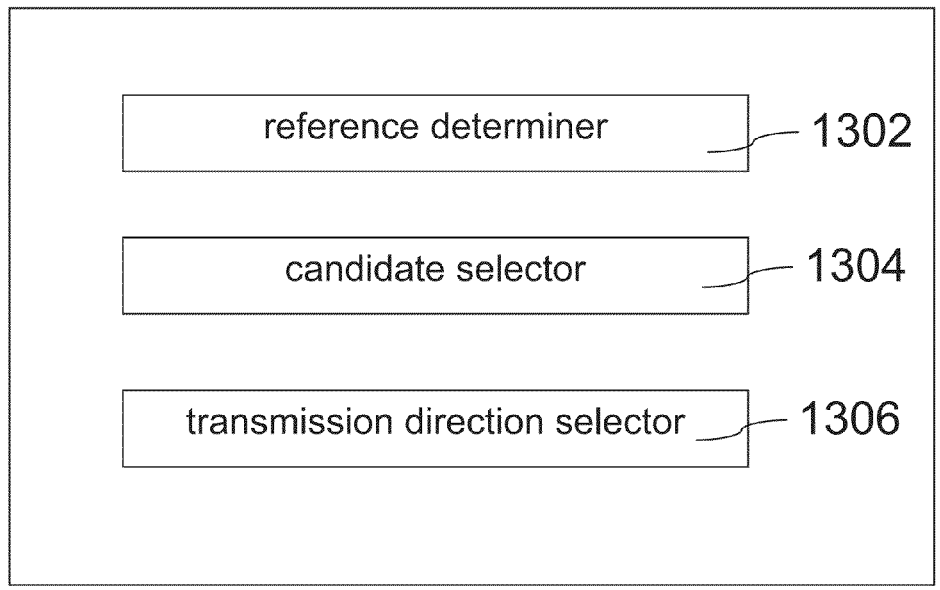
FIG. 12 shows a device configured to determine a transmission direction for a communication of a network component of a radio communications network.

FIG. 12 shows a device 1300 configured to determine a transmission direction for a communication of a network component of a radio communications network.

The device 1300 may, for example, be configured to perform the method 500 shown in FIG. 5 and/or the method 1200 shown in FIG. 11.

The device 1300 may include: a reference determiner 1302, a candidate selector 1304, and a transmission direction selector 1306.

The reference determiner 1302 may be configured to determine a reference transmission direction based on a plurality of predetermined transmission directions that a network component of a radio communications network is configured to transmit at.

The candidate selector 1304 may be configured to select a plurality of candidate transmission directions in a spatial vicinity of the reference transmission direction, the plurality of candidate transmission directions being a subset of the plurality of predetermined transmission directions.

The transmission direction selector 1306 may be configured to select a transmission direction for a communication of the network component from the reference transmission direction and the plurality of candidate transmission directions based on a selection criterion.

Various examples and aspects described in the context of methods 500 and 1200 may be analogously valid for the device 1300 described herein.

The device 1300 may be implemented by means of one or more circuits. For example, the reference determiner 1302, the candidate selector 1304 and/or the transmission direction selector 1306 may be implemented by means of one or more circuits.

The device 1300 may be a terminal (e.g. the terminal 102) of the radio communications network, and the communication may include a communication between the network component 106b and the terminal 102.

As described above, determining a transmission direction for a communication of a network component of a radio communications network may correspond to determining a precoding matrix for the communication. For example, a precoding matrix may include a transmission direction as well as a co-phasing (phase rotation) factor.

Figure 13:
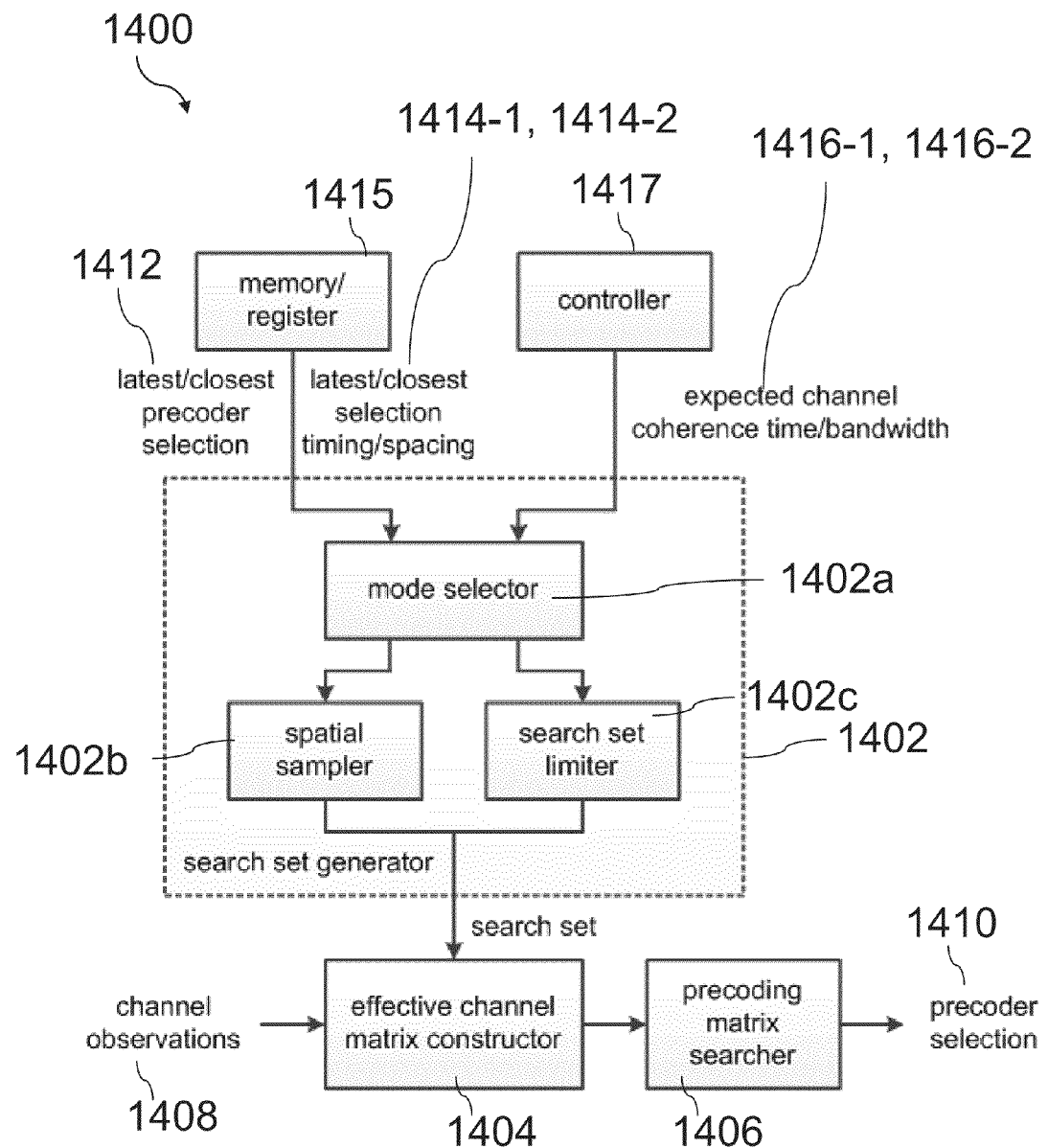
FIG. 13 shows a precoding matrix determiner configured to determine a precoding matrix for the communication of the network component.

FIG. 13 shows a precoding matrix determiner 1400 configured to determine a precoding matrix for the communication of the network component.

The precoding matrix determiner 1400 may include a search set generator 1402, an effective channel matrix constructor 1404, and a precoding matrix searcher 1406. The precoding matrix determiner 1400 may receive channel observations 1408 (e.g. as an input) and may produce a selected precoder 1410 (e.g. as an output).

The channel observations 1408 may be based on known reference signals located in a pre-determined time and frequency. The effective channel matrix constructor 1404 may generate an effective channel matrix, e.g. by performing a matrix multiplication of the observed channel matrix and a candidate precoding matrix among the search set given by the search set generator 1402. The precoding matrix searcher 1406 may search over the effective channel matrices corresponding to all valid candidate precoders in the search set, with respect to a desired optimization criterion. The selected precoding matrix 1410 (or, equivalently, its index) may be one that may satisfy the optimization criterion. It may be noted that the precoding matrix determiner 1400 may be configured for use with any codebook and any optimization criterion.

An input to the search set generator 1402 may include reference precoder indices 1412 that are either most recently selected or closest in frequency to the currently targeted band of interest. The input may include the time elapsed 1414-1 after the latest precoder selection and/or the frequency spacing 1414-2 between the closest band with precoder selection available and the target band. These inputs may be stored in memory or register 1415. The input to the search set generator 1402 may include expected channel coherence time 1416-1 and/or expected channel coherence bandwidth 1416-2, which may be determined based on channel observations that may be determined by means of a controller 1417. The expected channel coherence time 1416-1 and/or expected channel coherence bandwidth 1416-2 may, alternatively, be fixed in advance.

The search set generator 1402 may include a mode selector 1402a, a spatial sampler 1402b, and search set limiter 1402c. The mode selector 1402a may select among spatial sampling mode and/or time- and/or frequency-tracking mode based on the inputs to the search set generator 1402. The mode selector 1402a may be implemented with comparison logics. Based on the mode decision, either spatial sampler 1402b or search set limiter 1402c may be activated. If the mode selector 1402a chooses spatial sampling mode, spatial sampler 1402b may construct the precoder search set by selecting a representative transmission direction for each transmission group and co-phasing factors, e.g. as described above in relation to the spatial sampling mode. In case the mode selector 1402 chooses time/frequency-tracking mode, search set limiter 1402c may construct the precoder search set by limiting the candidate beams to spatially adjacent neighbors of the applicable reference precoding matrix, e.g. as described above in relation to the time and/or frequency-tracking modes. These operations can be implemented in hardware, software, or a combination of both.

According to various examples presented herein, a precoding matrix search set that may be a subset of a full codebook may be constructed, e.g. via utilization of at least the spatial coherence of channel correlation properties that arise in many communication channels. In addition to spatial coherence, spectral and/or temporal coherence may be utilized as well.

According to various examples presented herein, spatial coherence may be exploited to construct a sampled search set.

According to various examples presented herein, if time- or frequency-wise adjacent decision on precoder may be available, temporal and/or spectral coherence of the channel correlation may be exploited to adaptively construct a reduced search set.

According to various examples presented herein, the method 500 and/or the method 1200 may reduce the maximum computation complexity at each precoder-search instance.

The following examples pertain to further embodiments.

Example 1 is a method for determining a transmission direction for a communication of a network component of a radio communications network, the method comprising: determining a reference transmission direction based on a plurality of predetermined transmission directions that a network component of a radio communications network is configured to transmit at; selecting a plurality of candidate transmission directions in a spatial vicinity of the reference transmission direction, the plurality of candidate transmission directions being a subset of the plurality of predetermined transmission directions; and selecting a transmission direction for a communication of the network component from the reference transmission direction and the plurality of candidate transmission directions based on a selection criterion.

In Example 2, the subject matter of Example 1 can optionally include that determining the reference transmission direction comprises: selecting a previous transmission direction determined for a previous communication of the network component in case the previous transmission direction satisfies a reference condition, wherein the reference transmission direction comprises the selected previous transmission direction.

In Example 3, the subject matter of Example 2 can optionally include that the reference condition comprises a time of determining the previous transmission direction being within a predetermined time interval from the time of determining the transmission direction.

In Example 4, the subject matter of Example 3 can optionally include that the predetermined time interval is determined based on a channel coherence time of a communications channel between the network component and a terminal of the radio communications network.

In Example 5, the subject matter of Example 2 can optionally include that the reference condition comprises a frequency band of the previous communication being within a predetermined frequency interval from the frequency band of the communication.

In Example 6, the subject matter of Example 5 can optionally include that the predetermined frequency interval is determined based on a channel coherence bandwidth of a communications channel between the network component and a terminal of the radio communications network.

In Example 7, the subject matter of Example 1 can optionally include that determining the reference transmission direction comprises: determining a plurality of representative transmission directions based on the plurality of predetermined transmission directions; and selecting the reference transmission direction from the plurality of representative transmission directions.

In Example 8, the subject matter of Example 7 can optionally include that determining the plurality of representative transmission directions comprises: grouping the plurality of predetermined transmission directions into a plurality of transmission groups, wherein each transmission group comprises two or more predetermined transmission directions of the plurality of predetermined transmission directions; and selecting a respective representative transmission direction for a respective transmission group from the two or more predetermined transmission directions of the respective transmission group based on a parameter indicating which of the two or more predetermined transmission directions is for selection.

In Example 9, the subject matter of Example 8 can optionally include that a first transmission group is located next to and partially overlaps a second transmission group, and wherein a predetermined transmission direction of the first transmission group is a predetermined transmission direction of the second transmission group.

In Example 10, the subject matter of Example 8 can optionally include that the parameter comprises at least one of a fixed parameter having a constant value and a variable parameter selected from a plurality of candidate values.

In Example 11, the subject matter of Example 10 can optionally include that the variable parameter is randomly selected from the plurality of candidate values.

In Example 12, the subject matter of Example 10 can optionally include that the variable parameter is selected from the plurality of candidate values based on a previously selected variable parameter.

In Example 13, the subject matter of Example 8 can optionally include that the parameter comprises an index indicating which of the two or more predetermined transmission directions of the respective transmission group is for selection.

In Example 14, the subject matter of Example 7 can optionally include that selecting the reference transmission direction from the plurality of representative transmission directions comprises: determining which representative transmission direction of the plurality of representative transmission directions satisfies the selection criterion; and selecting the determined transmission direction as the reference transmission direction.

In Example 15, the subject matter of Example 1 can optionally include that selecting the plurality of candidate transmission directions in the spatial vicinity of the reference transmission direction comprises: selecting two or more predetermined transmission directions that are spatially adjacent to the reference transmission direction.

In Example 16, the subject matter of Example 1 can optionally include that selecting the plurality of candidate transmission directions in the spatial vicinity of the reference transmission direction comprises: selecting two or more predetermined transmission directions that are within an angular range of the reference transmission direction.

In Example 17, the subject matter of Example 16 can optionally include that the angular range is determined based on an expected rate of change of a communication channel with respect to an angle of departure of the reference transmission direction.

In Example 18, the subject matter of Example 1 can optionally include that selecting the plurality of candidate transmission directions in the spatial vicinity of the reference transmission direction comprises: grouping the plurality of predetermined transmission directions into a plurality of transmission groups, wherein each transmission group comprises two or more predetermined transmission directions of the plurality of predetermined transmission directions; and determining the transmission group that comprises the reference transmission direction, wherein the plurality of candidate transmission directions comprises two or more predetermined transmission directions of the determined transmission group other than the reference transmission direction.

In Example 19, the subject matter of Example 1 can optionally include that selecting the transmission direction for the communication of the network component from the reference transmission direction and the plurality of candidate transmission directions based on the selection criterion comprises: determining which transmission direction among the reference transmission direction and the plurality of candidate transmission directions satisfies the selection criterion; and selecting the transmission direction that satisfies the selection criterion as the transmission direction.

In Example 20, the subject matter of Example 1 can optionally include that the network component comprises a base station of the radio communications network.

In Example 21, the subject matter of Example 1 can optionally include that a respective predetermined transmission direction of the plurality of predetermined transmission directions corresponds to a respective beam of electromagnetic radiation radiated from the network component in a respective direction.

In Example 22, the subject matter of Example 1 can optionally include that the network component comprises a plurality of antennas, and wherein a respective predetermined transmission direction of the plurality of predetermined transmission directions corresponds to a respective precoding matrix for mapping a transmission signal vector to the plurality of antennas.

In Example 23, the subject matter of Example 1 can optionally include that the communication of the network component comprises a downlink communication of the network component.

In Example 24, the subject matter of Example 1 can optionally include that the selection criterion comprises a maximization of a first metric or a minimization of a second metric.

Example 25 is a method for determining a precoding matrix for a communication of a network component of a radio communications network, the method comprising: determining a reference precoding matrix based on a plurality of predetermined precoding matrices and a reference selection criterion; selecting a plurality of candidate precoding matrices from the plurality of predetermined precoding matrices based on a candidate selection criterion; and selecting a precoding matrix for a communication of the network component from the reference precoding matrix and the plurality of candidate precoding matrices based on a precoding selection criterion.

In Example 26, the subject matter of Example 25 can optionally include that determining the reference precoding matrix comprises: selecting a previous precoding matrix determined for a previous communication of the network component in case the previous precoding matrix satisfies a reference condition, wherein the reference precoding matrix comprises the selected previous precoding matrix.

In Example 27, the subject matter of Example 26 can optionally include that the reference condition comprises a time of determining the previous precoding matrix being within a predetermined time interval from the time of determining the precoding matrix.

In Example 28, the subject matter of Example 27 can optionally include that the predetermined time interval is determined based on a channel coherence time of a communications channel between the network component and a terminal of the radio communications network.

In Example 29, the subject matter of Example 26 can optionally include that the reference condition comprises a frequency band of the previous communication being within a predetermined frequency interval from the frequency band of the communication.

In Example 30, the subject matter of Example 29 can optionally include that the predetermined frequency interval is determined based on a channel coherence bandwidth of a communications channel between the network component and a terminal of the radio communications network.

In Example 31, the subject matter of Example 25 can optionally include that determining the reference precoding matrix comprises: determining a plurality of representative precoding matrices based on the plurality of predetermined precoding matrices; and selecting the reference precoding matrix from the plurality of representative precoding matrices.

In Example 32, the subject matter of Example 31 can optionally include that determining the plurality of representative precoding matrices comprises: grouping the plurality of predetermined precoding matrices into a plurality of transmission groups, wherein each transmission group comprises two or more predetermined precoding matrices of the plurality of predetermined precoding matrices; and selecting a respective representative precoding matrix for a respective transmission group from the two or more predetermined precoding matrices of the respective transmission group based on a parameter indicating which of the two or more predetermined precoding matrices is for selection.

In Example 33, the subject matter of Example 32 can optionally include that the parameter comprises at least one of a fixed parameter having a constant value and a variable parameter selected from a plurality of candidate values.

In Example 34, the subject matter of Example 33 can optionally include that the variable parameter is randomly selected from the plurality of candidate values.

In Example 35, the subject matter of Example 33 can optionally include that the variable parameter is selected from the plurality of candidate values based on a previously selected variable parameter.

In Example 36, the subject matter of Example 32 can optionally include that the parameter comprises an index indicating which of the two or more predetermined precoding matrices of the respective transmission group is for selection.

In Example 37, the subject matter of Example 31 can optionally include that selecting the reference precoding matrix from the plurality of representative precoding matrices comprises: determining which representative precoding matrix of the plurality of representative precoding matrices satisfies the second selection criterion; and selecting the determined precoding matrix as the reference precoding matrix.

In Example 38, the subject matter of Example 25 can optionally include that the network component comprises a base station of the radio communications network.

In Example 39, the subject matter of Example 25 can optionally include that a respective predetermined transmission direction of the plurality of predetermined transmission directions corresponds to a respective beam of electromagnetic radiation radiated from the network component in a respective direction.

In Example 40, the subject matter of Example 25 can optionally include that the network component comprises a plurality of antennas, and wherein a respective predetermined transmission direction of the plurality of predetermined transmission directions corresponds to a respective precoding matrix for mapping a transmission signal vector to the plurality of antennas.

In Example 41, the subject matter of Example 25 can optionally include that the communication of the network component comprises a downlink communication of the network component.

In Example 42, the subject matter of Example 25 can optionally include that the selection criterion comprises a maximization of a first metric or a minimization of a second metric.

Example 43 is a device configured to determine a transmission direction for a communication of a network component of a radio communications network, the device comprising: a reference determiner configured to determine a reference transmission direction based on a plurality of predetermined transmission directions that a network component of a radio communications network is configured to transmit at; a candidate selector configured to select a plurality of candidate transmission directions in a spatial vicinity of the reference transmission direction, the plurality of candidate transmission directions being a subset of the plurality of predetermined transmission directions; and a transmission direction selector configured to select a transmission direction for a communication of the network component from the reference transmission direction and the plurality of candidate transmission directions based on a selection criterion.

In Example 44, the subject matter of Example 43 can optionally be a terminal of the radio communications network, and wherein the communication comprises a communication between the network component and the terminal In Example 45, the subject matter of Example 43 can optionally include that determining the reference transmission direction comprises: selecting a previous transmission direction determined for a previous communication of the network component in case the previous transmission direction satisfies a reference condition, wherein the reference transmission direction comprises the selected previous transmission direction.

In Example 46, the subject matter of Example 44 can optionally include that the reference condition comprises a time of determining the previous transmission direction being within a predetermined time interval from the time of determining the transmission direction.

In Example 47, the subject matter of Example 45 can optionally include that the predetermined time interval is determined based on a channel coherence time of a communications channel between the network component and a terminal of the radio communications network.

In Example 48, the subject matter of Example 44 can optionally include that the reference condition comprises a frequency band of the previous communication being within a predetermined frequency interval from the frequency band of the communication.

In Example 49, the subject matter of Example 47 can optionally include that the predetermined frequency interval is determined based on a channel coherence bandwidth of a communications channel between the network component and a terminal of the radio communications network.

In Example 50, the subject matter of Example 43 can optionally include that determining the reference transmission direction comprises: determining a plurality of representative transmission directions based on the plurality of predetermined transmission directions; and selecting the reference transmission direction from the plurality of representative transmission directions.

In Example 51, the subject matter of Example 49 can optionally include that determining the plurality of representative transmission directions comprises: grouping the plurality of predetermined transmission directions into a plurality of transmission groups, wherein each transmission group comprises two or more predetermined transmission directions of the plurality of predetermined transmission directions; and selecting a respective representative transmission direction for a respective transmission group from the two or more predetermined transmission directions of the respective transmission group based on a parameter indicating which of the two or more predetermined transmission directions is for selection.

In Example 52, the subject matter of Example 50 can optionally include that a first transmission group is located next to and partially overlaps a second transmission group, and wherein a predetermined transmission direction of the first transmission group is a predetermined transmission direction of the second transmission group.

In Example 53, the subject matter of Example 50 can optionally include that the parameter comprises at least one of a fixed parameter having a constant value and a variable parameter selected from a plurality of candidate values.

In Example 54, the subject matter of Example 52 can optionally include that the variable parameter is randomly selected from the plurality of candidate values.

In Example 55, the subject matter of Example 52 can optionally include that the variable parameter is selected from the plurality of candidate values based on a previously selected variable parameter.

In Example 56, the subject matter of Example 50 can optionally include that the parameter comprises an index indicating which of the two or more predetermined transmission directions of the respective transmission group is for selection.

In Example 57, the subject matter of Example 49 can optionally include that selecting the reference transmission direction from the plurality of representative transmission directions comprises: determining which representative transmission direction of the plurality of representative transmission directions satisfies the selection criterion; and selecting the determined transmission direction as the reference transmission direction.

In Example 58, the subject matter of Example 43 can optionally include that selecting the plurality of candidate transmission directions in the spatial vicinity of the reference transmission direction comprises: selecting two or more predetermined transmission directions that are spatially adjacent to the reference transmission direction.

In Example 59, the subject matter of Example 43 can optionally include that selecting the plurality of candidate transmission directions in the spatial vicinity of the reference transmission direction comprises: selecting two or more predetermined transmission directions that are within an angular range of the reference transmission direction.

In Example 60, the subject matter of Example 43 can optionally include that the angular range is determined based on an expected rate of change of a communication channel with respect to an angle of departure of the reference transmission direction.

In Example 61, the subject matter of Example 43 can optionally include that selecting the plurality of candidate transmission directions in the spatial vicinity of the reference transmission direction comprises: grouping the plurality of predetermined transmission directions into a plurality of transmission groups, wherein each transmission group comprises two or more predetermined transmission directions of the plurality of predetermined transmission directions; and determining the transmission group that comprises the reference transmission direction, wherein the plurality of candidate transmission directions comprises two or more predetermined transmission directions of the determined transmission group other than the reference transmission direction.

In Example 62, the subject matter of Example 43 can optionally include that selecting the transmission direction for the communication of the network component from the reference transmission direction and the plurality of candidate transmission directions based on the selection criterion comprises: determining which transmission direction among the reference transmission direction and the plurality of candidate transmission directions satisfies the selection criterion; and selecting the transmission direction that satisfies the selection criterion as the transmission direction.

In Example 63, the subject matter of Example 43 can optionally include that the network component comprises a base station of the radio communications network.

In Example 64, the subject matter of Example 43 can optionally include that a respective predetermined transmission direction of the plurality of predetermined transmission directions corresponds to a respective beam of electromagnetic radiation radiated from the network component in a respective direction.

In Example 65, the subject matter of Example 43 can optionally include that the network component comprises a plurality of antennas, and wherein a respective predetermined transmission direction of the plurality of predetermined transmission directions corresponds to a respective precoding matrix for mapping a transmission signal vector to the plurality of antennas.

In Example 66, the subject matter of Example 43 can optionally include that the communication of the network component comprises a downlink communication of the network component.

In Example 67, the subject matter of Example 43 can optionally include that the selection criterion comprises a maximization of a first metric or a minimization of a second metric.

Example 68 is a device configured to determine a transmission direction for a communication of a network component of a radio communications network, the device comprising: a means for determining a reference transmission direction based on a plurality of predetermined transmission directions that a network component of a radio communications network is configured to transmit at; a means for selecting a plurality of candidate transmission directions in a spatial vicinity of the reference transmission direction, the plurality of candidate transmission directions being a subset of the plurality of predetermined transmission directions; and a means for selecting a transmission direction for a communication of the network component from the reference transmission direction and the plurality of candidate transmission directions based on a selection criterion.

In Example 69, the subject matter of Example 68 can optionally include that the device is a terminal of the radio communications network, and wherein the communication comprises a communication between the network component and the terminal.

Various examples and aspects described in the context of one of the devices or methods described herein may be analogously valid for the other devices or methods described herein.

While various aspects have been particularly shown and described with reference to these aspects of this disclosure, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A method for determining a transmission direction for a communication of a network component of a radio communications network, the method comprising:
    determining a reference transmission direction based on a plurality of predetermined transmission directions that a network component of a radio communications network is configured to transmit at;
    selecting a plurality of candidate transmission directions in a spatial vicinity of the reference transmission direction, the plurality of candidate transmission directions being a subset of the plurality of predetermined transmission directions;
    selecting a transmission direction for a communication of the network component from the reference transmission direction and the plurality of candidate transmission directions based on a selection criterion; and
    wherein selecting the plurality of candidate transmission directions in the spatial vicinity of the reference transmission direction comprises:
    grouping the plurality of predetermined transmission directions into a plurality of transmission groups, wherein each transmission group comprises two or more predetermined transmission directions of the plurality of predetermined transmission directions; and
    determining the transmission group that comprises the reference transmission direction, wherein the plurality of candidate transmission directions comprises two or more predetermined transmission directions of the determined transmission group other than the reference transmission direction.

2. The method of claim 1, wherein determining the reference transmission direction comprises:
    selecting a previous transmission direction determined for a previous communication of the network component in case the previous transmission direction satisfies a reference condition,
    wherein the reference transmission direction comprises the selected previous transmission direction.

3. The method of claim 2, wherein the reference condition comprises a time of determining the previous transmission direction being within a predetermined time interval from the time of determining the transmission direction.

4. The method of claim 3, wherein the predetermined time interval is determined based on a channel coherence time of a communications channel between the network component and a terminal of the radio communications network.

5. The method of claim 2, wherein the reference condition comprises a frequency band of the previous communication being within a predetermined frequency interval from the frequency band of the communication.

6. The method of claim 5, wherein the predetermined frequency interval is determined based on a channel coherence bandwidth of a communications channel between the network component and a terminal of the radio communications network.

7. The method of claim 1, wherein determining the reference transmission direction comprises:
    determining a plurality of representative transmission directions based on the plurality of predetermined transmission directions; and
    selecting the reference transmission direction from the plurality of representative transmission directions.

8. The method of claim 7, wherein determining the plurality of representative transmission directions comprises:
    grouping the plurality of predetermined transmission directions into a plurality of transmission groups, wherein each transmission group comprises two or more predetermined transmission directions of the plurality of predetermined transmission directions; and
    selecting a respective representative transmission direction for a respective transmission group from the two or more predetermined transmission directions of the respective transmission group based on a parameter indicating which of the two or more predetermined transmission directions is for selection.

9. The method of claim 7, wherein selecting the reference transmission direction from the plurality of representative transmission directions comprises:
    determining which representative transmission direction of the plurality of representative transmission directions satisfies the selection criterion; and
    selecting the determined transmission direction as the reference transmission direction.

10. The method of claim 1, wherein selecting the transmission direction for the communication of the network component from the reference transmission direction and the plurality of candidate transmission directions based on the selection criterion comprises:
    determining which transmission direction among the reference transmission direction and the plurality of candidate transmission directions satisfies the selection criterion; and
    selecting the transmission direction that satisfies the selection criterion as the transmission direction.

11. A device configured to determine a transmission direction for a communication of a network component of a radio communications network, the device comprising:
    a reference determiner configured to determine a reference transmission direction based on a plurality of predetermined transmission directions that a network component of a radio communications network is configured to transmit at;
    a candidate selector configured to select a plurality of candidate transmission directions in a spatial vicinity of the reference transmission direction, the plurality of candidate transmission directions being a subset of the plurality of predetermined transmission directions;
    a transmission direction selector configured to select a transmission direction for a communication of the network component from the reference transmission direction and the plurality of candidate transmission directions based on a selection criterion; and
    wherein selecting the plurality of candidate transmission directions in the spatial vicinity of the reference transmission direction comprises:
    grouping the plurality of predetermined transmission directions into a plurality of transmission groups, wherein each transmission group comprises two or more predetermined transmission directions of the plurality of predetermined transmission directions; and
    determining the transmission group that comprises the reference transmission direction,
    wherein the plurality of candidate transmission directions comprises two or more predetermined transmission directions of the determined transmission group other than the reference transmission direction.

12. The device of claim 11, being a terminal of the radio communications network, and wherein the communication comprises a communication between the network component and the terminal.

13. The device of claim 11, wherein the network component comprises a base station of the radio communications network.

14. The device of claim 11, wherein the communication of the network component comprises a downlink communication of the network component.

* * * * *